United States Patent
Cliff et al.

(10) Patent No.: US 11,808,289 B2
(45) Date of Patent: Nov. 7, 2023

(54) FLUID PRESSURE BOOST SYSTEM AND METHOD

(71) Applicant: Deere & Company, Moline, IL (US)

(72) Inventors: Michael J. Cliff, Coffeyville, KS (US); Steven R. Fliearman, Coffeyville, KS (US); Benjamin K. Dollins, Coffeyville, KS (US)

(73) Assignee: Deere & Company, Moline, IL (US)

( * ) Notice: Subject to any disclaimer, the term of this patent is extended or adjusted under 35 U.S.C. 154(b) by 106 days.

(21) Appl. No.: 17/509,814

(22) Filed: Oct. 25, 2021

(65) Prior Publication Data

US 2023/0131740 A1 Apr. 27, 2023

(51) Int. Cl.
*F15B 3/00* (2006.01)
*F15B 1/02* (2006.01)
*F15B 1/033* (2006.01)
*F15B 1/04* (2006.01)
*F15B 11/08* (2006.01)

(52) U.S. Cl.
CPC ............... *F15B 3/00* (2013.01); *F15B 1/024* (2013.01); *F15B 1/033* (2013.01); *F15B 1/04* (2013.01); *F15B 11/08* (2013.01); *F15B 2211/212* (2013.01); *F15B 2211/665* (2013.01)

(58) Field of Classification Search
CPC ............ F15B 3/00; F15B 1/024; F15B 1/033; F15B 1/04; F15B 2211/212; F15B 2211/665; F15B 11/08
See application file for complete search history.

(56) References Cited

U.S. PATENT DOCUMENTS

| | | | | |
|---|---|---|---|---|
| 3,889,340 A | * | 6/1975 | Dixon, Jr. | B21F 15/06 92/152 |
| 4,349,041 A | | 9/1982 | Bates | |
| 4,924,671 A | * | 5/1990 | Reinert | B30B 15/16 91/193 |

(Continued)

FOREIGN PATENT DOCUMENTS

CN 206263242 U 6/2017

OTHER PUBLICATIONS

U.S. Non-Final Office Action dated May 11, 2022 for U.S. Appl. No. 17/509,821 (12 pages).

*Primary Examiner* — Dustin T Nguyen
(74) *Attorney, Agent, or Firm* — Tucker Ellis LLP

(57) ABSTRACT

A hydraulic fluid pressure amplifier system includes a boost cylinder assembly, an energy storage device in fluid communication with the boost cylinder assembly, and a working cylinder assembly. The boost cylinder assembly is configured to selectively receive a plunger member into a boost cylinder, wherein movement of the plunger member received in the boost cylinder compresses a charge fluid within a blind side volume of the boost cylinder from a first fluid pressure to an amplified fluid pressure greater than the first pressure. The working cylinder assembly is selectively operable responsive to receiving a source hydraulic fluid having a nominal fluid pressure less than the amplified fluid pressure for effecting the movement of the plunger member into the boost cylinder. The energy storage device is operable to selectively receive and store a portion of the charge fluid compressed to the amplified fluid pressure.

18 Claims, 9 Drawing Sheets

(56) References Cited

U.S. PATENT DOCUMENTS

| | | | | |
|---|---|---|---|---|
| 5,634,773 | A | * | 6/1997 | Tanino ............... F15B 3/00 |
| | | | | 60/420 |
| 5,735,140 | A | | 4/1998 | Becker et al. |
| 6,012,287 | A | * | 1/2000 | Sims ............... F15B 11/0325 |
| | | | | 60/563 |
| 6,295,914 | B1 | * | 10/2001 | Iversen ............... F15B 3/00 |
| | | | | 417/403 |
| 6,776,080 | B2 | * | 8/2004 | Hansen ............... F15B 3/00 |
| | | | | 91/300 |
| 8,220,773 | B2 | | 7/2012 | Gustafson |
| 8,286,426 | B2 | | 10/2012 | Bishop |
| 8,997,474 | B2 | * | 4/2015 | Lewry ............... F15B 3/00 |
| | | | | 60/369 |
| 9,970,409 | B2 | | 5/2018 | Calonius et al. |
| 10,072,680 | B2 | | 9/2018 | Hahn et al. |
| 10,132,135 | B2 | * | 11/2018 | Gaude ............... E21B 33/0355 |
| 10,677,267 | B2 | | 6/2020 | Krischer |
| 10,683,853 | B2 | | 6/2020 | Gallelli et al. |
| 11,105,346 | B2 | * | 8/2021 | Zavadinka ............... F15B 3/00 |
| 2009/0317267 | A1 | * | 12/2009 | Gill ............... F15B 3/00 |
| | | | | 417/505 |
| 2015/0192017 | A1 | * | 7/2015 | Quiros Morales .... F04B 53/148 |
| | | | | 92/62 |
| 2020/0332781 | A1 | * | 10/2020 | Prigent ............... F15B 3/00 |

* cited by examiner

FLUID PRESSURE BOOST SYSTEM AND METHOD

FIELD OF THE DISCLOSURE

This disclosure relates to systems and methods for generating an increased hydraulic fluid pressure and, in particular, to a fluid pressure boost system and method that raises the nominal pressure of a received source hydraulic fluid and provides a supply hydraulic fluid having a desired raised pressure that is greater than the nominal pressure of the received source hydraulic fluid.

BACKGROUND

Prior standardized onboard hydraulic supply systems and methods in work vehicles and other equipment can sometimes be rendered inefficient and/or ineffective. This is due in part to end users tasking those standardized systems with supporting an ever-increasing range of auxiliary hydraulic power consuming systems, and the manufactures' willingness to integrate an ever-increasing array of additional power consuming systems into vehicles and other equipment to satisfy the commercial desire for additional diverse functionalities. In addition to the above, the standardized hydraulic supply systems must also be able to support basic incremental improvements made to the basic fluid power systems in the evolution of the vehicle product offerings.

As an example, a hydraulic supply system that is used for providing high volume oil at a low continuous pressure to support lubrication and cooling functions in a work vehicle such as a tractor or construction vehicle for example, might also be additionally tasked with servicing the periodic low volume high pressure demands of power shifting control functions of the work vehicle transmission for certain vehicle configuration packages and/or application uses. Such hydraulic systems therefore must be capable of periodically supporting demands for a high volume of oil at a high pressure.

In typical work vehicle applications such as in farming tractors, for example, the control of a power shift transmission may require a supply of oil delivered at a high pressure in order to effect shifting operations in the transmissions. However, the high pressure requirement is usually only intermittently needed and, further, is typically only for short periods of time. As an example, a work vehicle may require a hydraulic fluid flow of about 30 gallons per minute (GPM) delivered at 300 pounds per square inch (PSI) for about 500 ms. in order to effect a transmission shift operation.

Also in typical work vehicle applications such as in tractor or construction vehicles for example, the lubrication and cooling system of those work vehicles may require, nominally, oil delivered during operation of the tractor or construction vehicle at a flow rate of about 10 GPM, and at a delivered pressure of about 45 PSI.

As a practical matter therefore, the pump of typical hydraulic supply systems used in work vehicles must be sized to support the possibly simultaneous demands of both the control of the power shift transmission as well as the lubrication and cooling system such as may occur during heavy use of the vehicle when both systems might operate at full use or duty cycle. That is, the hydraulic fluid delivery system is typically sized to provide the aggregate of the maximum overall volumes required and also to deliver the aggregate of the maximum of the overall pressures required. In the particular example given above, the hydraulic fluid delivery system may therefore be required to be sized to supply about 40 GPM at about 300 PSI. Operating a hydraulic fluid delivery system in a continuous mode in order to meet the demands of the supported systems as they may need fluid flow and power may draw or otherwise consume large amounts of sustained power in the pump support system. Although the "extra" flow of the high volume pump can be dumped "over relief" and directed to a line to the lubrication and cooling system to lubricate and potentially cool the transmission, there is still a direct energy loss as this newly pressurized oil such as at, for example, 300 psi, is now dropped in pressure such as to, for example, 45 psi, and sent to the transmission as low pressure lube and cooling flow. The energy of the pressure drop is undesirably converted to heat in the oil and thus further may also require special treatment such as an additional cooling of the oil.

In the example, a relatively large displacement, relatively high pressure pump is therefore typically required. Alternatively, a large variable pump capable of delivering the required aggregate of the pressures and flows may be specified for the application. In either case, however, it could be considered inefficient to provide a hydraulic supply system that stands ready at all times to deliver oil at a high pressure and volume when the high pressure is needed only intermittently, and only by a few (one in the example) fluid consumers. In essence, in the example, such prior hydraulic supply systems include both a pump and a pump motor that are sized to support the peak power loading even though these peak demands may be relatively short-lived and infrequently experienced such as may occur during shifting of the transmission or the like during heavy use of the vehicle.

It is therefore desirable to provide efficient hydraulic supply systems and methods to supply hydraulic power to functional systems of associated work vehicles such as tractors, for example.

It is further desirable to provide efficient hydraulic supply systems and methods that raise the nominal pressure of a source hydraulic fluid received by the system and that provide a supply hydraulic fluid having a desired raised pressure greater than the nominal pressure of the source hydraulic fluid received by the system.

It is further desirable to provide efficient hydraulic supply systems and methods that essentially operate using the nominal pressure of the source hydraulic fluid itself to power the system to generate the supply hydraulic fluid having the higher desired pressure greater than the nominal pressure.

SUMMARY

The embodiments herein provide efficient hydraulic supply systems and methods to supply hydraulic power to functional systems of associated work vehicles such as commercial, agricultural, and construction vehicles, for example.

The embodiments herein further provide efficient hydraulic supply systems and methods that raise the nominal pressure of a received source hydraulic fluid and that provide a supply hydraulic fluid having a desired raised or amplified pressure greater than the nominal pressure of the received source hydraulic fluid.

The embodiments herein further provide efficient hydraulic supply systems and methods that essentially operate using the nominal pressure of the source hydraulic fluid itself to power the system to generate the supply hydraulic fluid having the higher desired pressure greater than the nominal pressure.

In accordance with an aspect of the disclosure, a hydraulic fluid pressure amplifier system that boosts or otherwise amplifies or increases a pressure of a hydraulic fluid is provided. The hydraulic fluid pressure amplifier system includes a boost cylinder assembly, an energy storage device in fluid communication with the boost cylinder assembly, and a working cylinder assembly. The boost cylinder assembly is configured to selectively receive a plunger member into a boost cylinder, wherein movement of the plunger member received in the boost cylinder compresses a charge fluid within a blind side volume of the boost cylinder from a first fluid pressure to an amplified fluid pressure greater than the first pressure. The working cylinder assembly is selectively operable responsive to receiving a source hydraulic fluid having a nominal fluid pressure less than the amplified fluid pressure for effecting the movement of the plunger member into the boost cylinder. The energy storage device is operable to selectively receive and store a portion of the charge fluid compressed to the amplified fluid pressure.

In any of the embodiments herein, the working cylinder assembly includes a working cylinder and a working cylinder piston disposed in the working cylinder. The working cylinder piston divides the working cylinder into working cylinder volumetric sections including a working side volume configured to receive the source hydraulic fluid, and a rod side volume in fluid communication with the blind side volume of the boost cylinder. A pressurized hydraulic fluid having the amplified fluid pressure is selectively delivered to an output port operatively coupled with the rod side volume of the working cylinder assembly by the amplified fluid pressure of the portion of the charge fluid stored in the energy storage device being selectively communicated to backfill hydraulic fluid in the rod side volume of the working cylinder assembly via the charge fluid in the blind side volume of the boost cylinder acting on the backfill hydraulic fluid in the rod side volume of the working cylinder assembly.

In any of the embodiments herein, the working cylinder assembly includes a working cylinder and a working cylinder piston movable within the working cylinder and, in addition, the plunger member and the working cylinder piston are operatively mutually coupled.

In any of the embodiments herein, the working cylinder piston divides the working cylinder into volumetric sections including a rod side volume and a working side volume, and the working cylinder piston is operable responsive to the working cylinder assembly receiving the source hydraulic fluid into the working side volume of the working cylinder to move the plunger member into the boost cylinder to compress the charge fluid within the blind side volume of the boost cylinder.

In any of the embodiments herein, the plunger member is carried on the working cylinder piston, and the return end of the boost cylinder defines a boost cylinder aperture configured to selectively receive the plunger member into the blind side volume of the boost cylinder to compress the charge fluid within the blind side volume of the boost cylinder from the first fluid pressure to the amplified fluid pressure greater than the first pressure.

In any of the embodiments herein, a seal member is disposed on the return end of the boost cylinder, wherein the seal member effects a fluid seal between the boost cylinder aperture and the plunger member received into the blind side volume of the boost cylinder.

In any of the embodiments herein, the plunger member defines a compression side facing the blind side volume of the boost cylinder. The compression side of the plunger member has a first surface area. In addition, the working cylinder piston defines a low pressure side open to the working side volume of the working cylinder and having a second surface area greater than the first surface area of the compression side of the plunger member. In further addition, the working cylinder piston is selectively movable relative to the working cylinder for effecting the movement of the plunger member towards the high pressure end of the boost cylinder responsive to the working cylinder assembly receiving the source hydraulic fluid into the working side volume of the working cylinder.

In any of the embodiments herein, a fluid check valve is carried by the plunger member, wherein the plunger member defines a passageway open on a first end to the compression side of the plunger member facing the blind side volume of the boost cylinder, and open on a second end on a side of the plunger member. The fluid check valve is operable to permit a flow of hydraulic fluid though the passageway from the second end of the passageway to the first end of the passageway, and the fluid check valve is operable to restrict the flow of hydraulic fluid though the passageway from the first end of the passageway to the second end of the passageway.

In any of the embodiments herein, the working cylinder piston is operable to move between opposite working pressure and high pressure ends of the working cylinder. In addition, the working cylinder assembly is configured to alternately receive the source hydraulic fluid having the nominal fluid pressure less than the amplified fluid pressure into the rod side volume of the working cylinder as backfill fluid to operate the working cylinder piston to move towards the working pressure end of the working cylinder, receive via the boost cylinder aperture as the compression side of the plunger member withdraws from the boost cylinder aperture the amplified fluid pressure of the charge fluid within the blind side volume of the boost cylinder to pressurize the backfill fluid within the rod side volume of the working cylinder to the amplified fluid pressure to form a pressurized hydraulic fluid for selective delivered to an output port of the fluid pressure amplifier system operatively coupled with the working cylinder assembly.

In any of the embodiments herein, the hydraulic fluid pressure amplifier system includes a valve system including a storage valve disposed between the boost cylinder assembly and the energy storage device, and an actuate valve disposed between the working cylinder assembly and an associated fluid source providing the source hydraulic fluid to the hydraulic fluid pressure amplifier system. The storage valve is responsive to a storage valve signal to open to permit a flow of the charge fluid having the amplified fluid pressure between the blind side volume of the boost cylinder assembly and the energy storage device for the energy storage device to selectively receive and store the portion of the charge fluid compressed to the amplified fluid pressure. The actuate valve is responsive to an actuate valve signal to open to permit a flow of the source hydraulic fluid into the working side volume of the working cylinder assembly from the associated fluid source to operate the working cylinder piston to move the plunger member into the boost cylinder to compress the charge fluid within the blind side volume of the boost cylinder.

In any of the embodiments herein, the hydraulic fluid pressure amplifier system includes a control system including a processor device, an interface device operatively coupled with the processor device, a memory device operatively coupled with the processor device, and logic stored in the memory device. The logic is executable by the processor device to cause the hydraulic fluid pressure amplifier system to selectively generate the storage valve signal to operate the storage valve to open to permit the flow of the flow of the charge fluid having the amplified fluid pressure between the blind side volume of the boost cylinder assembly and the energy storage device. The logic is further executable by the processor device to cause the hydraulic fluid pressure amplifier system to selectively generate the actuate valve signal to operate the actuate valve to open to permit the flow of the source hydraulic fluid into the working side volume of the working cylinder assembly from the associated fluid source.

In any of the embodiments herein, the valve system of the hydraulic fluid pressure amplifier system includes a backfill valve disposed between the boost cylinder assembly and the associated fluid source, wherein the backfill valve is responsive to a backfill valve signal to open to permit a flow of a backfill hydraulic fluid into the rod side volume of the working cylinder assembly from the associated fluid source. In addition, the logic of the control system of the hydraulic fluid pressure amplifier system is executable by the processor device to cause the hydraulic fluid pressure amplifier system to selectively generate the backfill valve signal to operate the backfill valve to open to permit the flow of the backfill hydraulic fluid into the rod side volume of the working cylinder assembly from the associated fluid source.

In any of the embodiments herein, the logic of the control system of the hydraulic fluid pressure amplifier system is executable by the processor device to sequentially generate the backfill valve signal, the actuate valve signal, and the storage valve signal, to sequentially operate the backfill valve, the actuate valve, and the storage valve to render from the working cylinder assembly, based on the source hydraulic fluid having the nominal fluid pressure, a pressurized hydraulic fluid having the amplified fluid pressure for selective delivered to an output port of the fluid pressure amplifier system operatively coupled with the working cylinder assembly.

In accordance with a further aspect of the disclosure, a method of boosting or otherwise amplifying or increasing a pressure of a hydraulic fluid is provided. The method includes operating a working hydraulic cylinder assembly using a source hydraulic fluid having a nominal fluid pressure to develop, based on the operating of the working hydraulic cylinder assembly, a pressurized supply hydraulic fluid in a boost cylinder assembly operatively coupled with the working hydraulic cylinder assembly, wherein the pressurized supply hydraulic fluid has a supply fluid pressure greater than the nominal fluid pressure. The method further includes storing the pressurized supply hydraulic fluid having the supply fluid pressure in an energy storage device operatively coupled with the boost cylinder assembly.

In any of the embodiments herein, the method of boosting or otherwise amplifying or increasing the pressure of the hydraulic fluid includes operating the working hydraulic cylinder assembly by effecting movement of a working cylinder piston of the working hydraulic cylinder assembly using the source hydraulic fluid having the nominal fluid pressure. In addition, the pressurized supply hydraulic fluid in the boost cylinder assembly is developed by effecting, by the movement of the working cylinder piston, movement of a plunger member carried on the working cylinder piston to compress hydraulic fluid in a blind side volume of a boost cylinder of the boost cylinder assembly to generate the pressurized supply hydraulic fluid having the amplified fluid pressure greater than the nominal fluid pressure within the boost cylinder assembly.

In any of the embodiments herein, the method of boosting or otherwise amplifying or increasing the pressure of the hydraulic fluid includes communicating the amplified fluid pressure of the pressurized supply hydraulic fluid stored within the energy storage device to the working hydraulic cylinder assembly to boost the nominal fluid pressure of the source hydraulic fluid within the working hydraulic cylinder assembly to the amplified fluid pressure greater than the nominal fluid pressure.

In any of the embodiments herein, the method of boosting or otherwise amplifying or increasing the pressure of the hydraulic fluid includes applying the pressurized supply hydraulic fluid stored within the energy storage device to the hydraulic fluid in the blind side volume of the boost cylinder of the boost cylinder assembly. The method further includes acting upon backfill hydraulic fluid within the working hydraulic cylinder assembly by the hydraulic fluid in the blind side volume of the boost cylinder via an aperture defined between the boost and working hydraulic cylinders to boost the nominal fluid pressure of the backfill hydraulic fluid within the working hydraulic cylinder assembly to the amplified fluid pressure greater than the nominal fluid pressure.

In any of the embodiments herein, the method of boosting or otherwise amplifying or increasing the pressure of the hydraulic fluid includes operating the working hydraulic cylinder assembly by effecting movement of a working cylinder piston of the working hydraulic cylinder assembly using the source hydraulic fluid having the nominal fluid pressure to cause a plunger member operatively coupled with the working cylinder piston of the working hydraulic cylinder assembly to extend into the boost cylinder assembly. The method further includes developing the pressurized supply hydraulic fluid by compressing, by the plunger member extending via a passageway into the boost cylinder assembly, hydraulic fluid in the boost cylinder assembly to generate the pressurized supply hydraulic fluid having the amplified fluid pressure greater than the nominal fluid pressure within the boost cylinder assembly.

In any of the embodiments herein, the method of boosting or otherwise amplifying or increasing the pressure of the hydraulic fluid includes communicating the amplified fluid pressure of the pressurized supply hydraulic fluid stored within the energy storage device to the working hydraulic cylinder assembly to boost the nominal fluid pressure of the source hydraulic fluid within the working hydraulic cylinder assembly to the amplified fluid pressure greater than the nominal fluid pressure.

In any of the embodiments herein, the method of boosting or otherwise amplifying or increasing the pressure of the hydraulic fluid includes operating the working hydraulic cylinder assembly to effect movement of the working cylinder piston of the working hydraulic cylinder assembly using the source hydraulic fluid having the nominal fluid pressure to cause the plunger member operatively coupled with the working cylinder piston of the working hydraulic cylinder assembly to withdraw via the passageway from the boost cylinder assembly. The method further includes applying the pressurized supply hydraulic fluid stored within the energy storage device to the boost cylinder assembly. The method further includes communicating the pressurized supply hydraulic fluid from the boost cylinder assembly to the working hydraulic cylinder assembly via the passageway.

BRIEF DESCRIPTION OF THE DRAWINGS

In the accompanying drawings which are incorporated in and constitute a part of the specification, example embodiments of the novel fluid pressure boost system and fluid pressure boost method are illustrated, which, together with a general description of the fluid pressure boost system and method given above, and the detailed description given below, serve to exemplify the example embodiments of the claimed invention.

DETAILED DESCRIPTION

Figure 1:
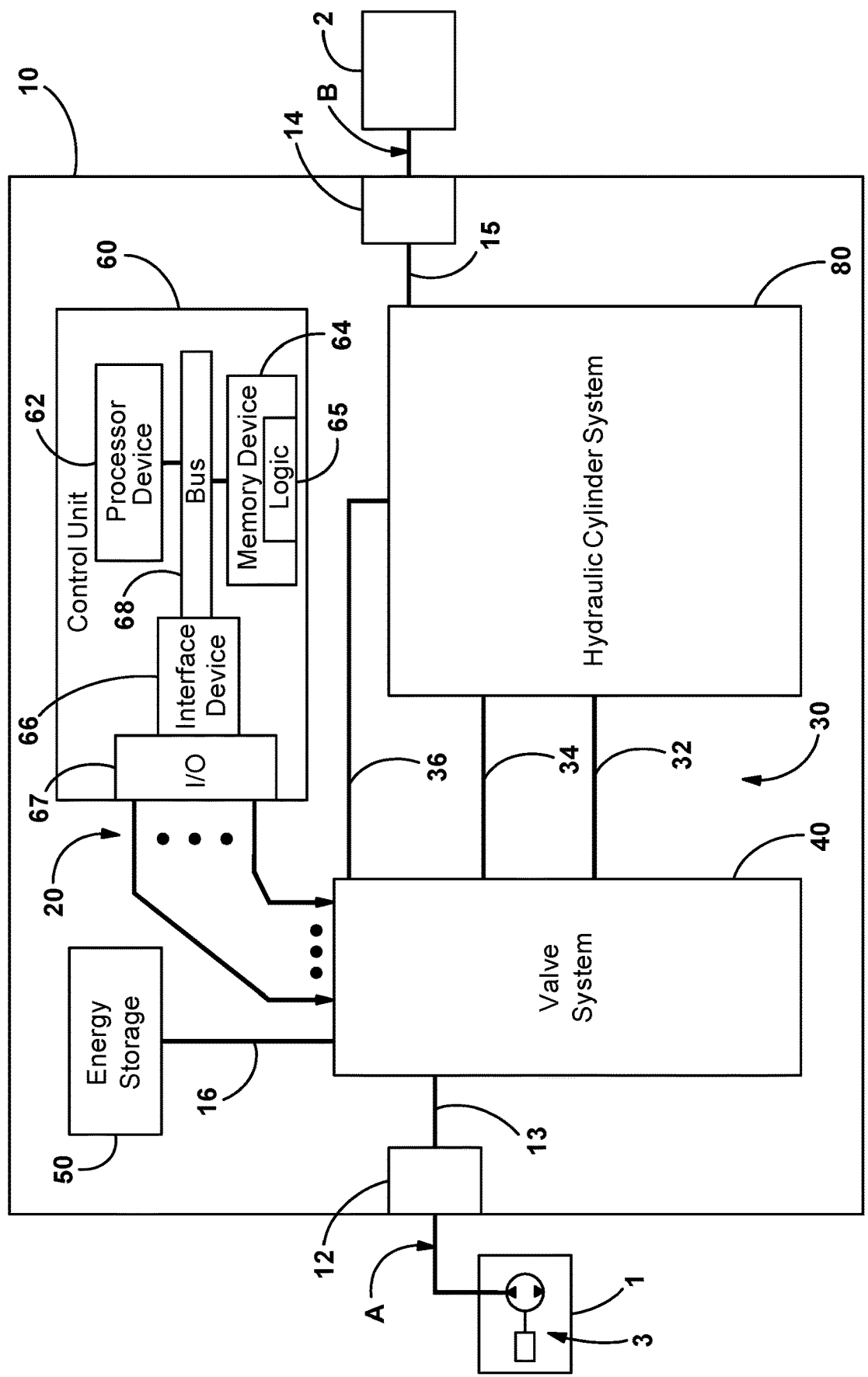
FIG. 1 is a schematic overview representation of a fluid pressure boost system in accordance with an example embodiment.

The following describes one or more example embodiments of the disclosed fluid pressure boost system and fluid pressure boost method, as shown in the accompanying figures of the drawings described briefly above. Various modifications to the example embodiments may be contemplated by one of skill in the art without departing from the spirit and scope of the claims herein.

As used herein, the "axial" direction may refer to a direction that is generally parallel to an axis of rotation, axis of symmetry, or centerline of a component or components. For example, in a cylinder with a centerline and opposite, circular ends, the "axial" direction may refer to the direction that generally extends in parallel with the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft.

Also as used herein, "radially" aligned may refer to two components that are both disposed along a line extending perpendicularly outwardly from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned although one or both of the components may not be cylindrical (or otherwise radially symmetric). For example, a rotating shaft may be "radially" aligned with a rectangular housing containing the shaft over a length of the shaft that axially overlaps with the housing.

Described herein is a fluid pressure boost system and a fluid pressure boost method that raises or otherwise amplifies or increases the nominal pressure of a source hydraulic fluid received by the system and generates a supply hydraulic fluid provided by the system, wherein the supply hydraulic fluid generated by the system has a desired pressure that is greater than the nominal pressure of the received source hydraulic fluid. The system and method of the example embodiments elevate or otherwise amplify the nominal pressure of the source hydraulic fluid to a higher pressure level as may be necessary and/or desired to operate one or more hydraulic fluid consuming systems supplied by the system such as for example, clutch control systems in an associated work vehicle. In addition, the system and method of the example embodiments described herein render the nominal pressure of the source hydraulic fluid having the higher desired pressure without the requirement or need for additional fluid pumps or motors for driving those pumps. In further addition, the system and method of the example embodiments described herein essentially operate using the nominal pressure of the source hydraulic fluid itself as a source of power to effect operation of the system to generate the supply hydraulic fluid having the higher desired pressure greater than the nominal pressure. The pressure of the supply hydraulic fluid that is generated by the system and method of the example embodiments may be delivered to an associated hydraulic fluid consumer at a substantially greater pressure, such as up to about five (5) times greater for example, than the nominal pressure of the source hydraulic fluid received by the system. The pressure of the supply hydraulic fluid that is generated by the system and method of the example embodiments may be delivered to an associated hydraulic fluid consumer at a substantially greater pressure, such as up to about five (5) times greater for example, than the pressure that may be received from an associated modestly-sized auxiliary hydraulic fluid source.

As shown in FIG. 1 by way of example, a hydraulic fluid pressure amplifier system 10 operates to increase or otherwise boost the pressure of a source hydraulic fluid A received from an associated fluid source 1 under a nominal first pressure via an input port 12 to a desired raised or amplified second pressure greater than the first pressure for delivery of the hydraulic fluid having an amplified or otherwise raised or elevated second pressure as a high pressure supply hydraulic fluid B to an associated hydraulic fluid consumer 2 via an output port 14. In an example embodiment, the source hydraulic fluid A may be received from the associated fluid source 1 at a nominal first pressure of about 60-80 pounds per square inch (PSI) for example, and the hydraulic fluid pressure amplifier system 10 may be operated to provide or otherwise develop or render the high pressure supply hydraulic fluid B at an amplified second pressure of about 250-300 PSI for example. Further in the example embodiment, the hydraulic fluid pressure amplifier system 10 is configured to receive the source hydraulic fluid A from any type of associated fluid source 1 under the nominal first pressure via the input port 12, wherein the associated fluid source 1 may be for example a low pressure electrically-driven pump system 3 as shown capable of delivering the source hydraulic fluid A at a nominal first pressure of about 60-80 PSI for example to the hydraulic fluid pressure amplifier system 10.

The hydraulic fluid pressure amplifier system 10 of the example embodiment in general comprises a valve system 40 operatively coupled with the input port 12 via a feed line 13. The hydraulic fluid pressure amplifier system 10 of the example embodiment further includes an energy storage device 50 operatively coupled with the valve system 40 via a storage communication line 16, and a control unit 60 operatively coupled with the valve system 40 via a plurality of valve control signal lines 20. In addition, the hydraulic fluid pressure amplifier system 10 of the example embodiment still further includes a hydraulic cylinder system 80 operatively coupled between the valve system 40 and the output port 14. In the example embodiment, the hydraulic cylinder system 80 is operatively coupled with the output port 14 via a supply line 15, and it is operatively coupled with the valve system 40 via a plurality of hydraulic cylinder control lines 30. The plurality of hydraulic cylinder control lines 30 include a working cylinder energize line 32, a working cylinder backfill line 34, and an energy storage shuttle line 36, each of which will be described below.

In accordance with an example embodiment, the valve system 40 operates under the control and direction of the control unit 60 to receive the source hydraulic fluid A via the input port 12, and to cause the source hydraulic fluid A to be compressed to the desired higher pressure for use by the associated fluid consumer 2 as the supply hydraulic fluid B. The hydraulic fluid pressurized by the a hydraulic cylinder system 80 may be stored in the energy storage device 50 as it is generated, and afterwards, so that it may be subsequently paid out or otherwise distributed or the like to the associated fluid consumer 2 as the high pressure supply hydraulic fluid B via the output port 14 as may be needed during operation of the associated fluid consumer 2.

In accordance with an example embodiment, the raised pressure of the hydraulic fluid may be transferred to the associated fluid consumer 2 via the output port 14 by reflecting or otherwise communicating the raised pressure back from the energy storage device 50 and to the output port 14 through the hydraulic cylinder system 80 itself. In that way, the raised pressure of the pressurized hydraulic fluid may be stored at least partially in the energy storage device 50 and at least partiality in the hydraulic cylinder system 80. That is, a portion of the hydraulic fluid pressurized by the hydraulic cylinder system 80 to the raised pressure may be stored in the energy storage device 50, and a further portion of the hydraulic fluid also having the raised pressure may be stored within the hydraulic cylinder system 80, such as for example, in a back-filled portion of the hydraulic cylinder system 80. The portion of the hydraulic fluid that is pressurized by the hydraulic cylinder system 80 to the raised pressure and that is stored in the energy storage device 50 may be used to reciprocally back-pressurize the portion of the hydraulic fluid back-filled to within a portion of the hydraulic cylinder system 80 as will be described in greater detail below.

In this regard and in an example embodiment, selected portions of the hydraulic cylinder system 80 may act as a pressure and fluid flow pass-through chamber for communicating the raised pressure of the hydraulic fluid pressurized by the hydraulic cylinder system 80 from the energy storage device 50 to the associated fluid consumer 2 via the back-fill portion of the hydraulic cylinder system 80. In that way the hydraulic fluid pressurized by the a hydraulic cylinder system 80 and stored in the energy storage device 50 may be indirectly communicated to the associated fluid consumer 2 via the hydraulic cylinder system 80 and the output port 14 for supplying the associated fluid consumer 2 with the supply hydraulic fluid B as may be necessary or desired. In accordance with a further example embodiment, the raised pressure of the hydraulic fluid pressurized by the hydraulic cylinder system 80 may be directly distributed from the energy storage device 50 to the associated fluid consumer 2 such as by porting the pressurized fluid from the energy storage device 50 directly to the output port 14 using one or more suitable valve(s), conduit(s) or the like thereby effectively bypassing the fluid flow pass-through chamber of the hydraulic cylinder system 80. In accordance with a still further example embodiment, a first portion of the raised pressure of the hydraulic fluid pressurized by the hydraulic cylinder system 80 may be directly distributed from the energy storage device 50 to the associated fluid consumer 2 by porting the pressurized fluid from the energy storage device 50 directly to the output port 14 using one or more suitable valve(s), conduit(s) or the like thereby effectively bypassing the fluid flow pass-through chamber of the hydraulic cylinder system 80, and a second further portion of the raised pressure of the hydraulic fluid pressurized by the hydraulic cylinder system 80 may be indirectly communicated to the associated fluid consumer 2 via the fluid flow pass-through chamber of the hydraulic cylinder system 80 and the output port 14 for supplying the associated fluid consumer 2 with the supply hydraulic fluid B as may be necessary or desired. However, it is to be appreciated that in the example embodiment described, the hydraulic fluid that is pressurized by the hydraulic cylinder system 80 to the raised pressure and that is stored in the energy storage device 50 remains within the energy storage device 50 and within a limited portion of the hydraulic cylinder system 80 to be described below, and it is not co-mingled or otherwise mixed with the source or supply hydraulic fluids A, B.

With continued reference to FIG. 1, the control unit 60 of the example embodiment includes a processor device 62 operatively coupled with a memory device 64 and with an interface device 66 by a suitable bus 68. The memory device 64 operates to store logic 65 that is executable by the processor to cause the hydraulic fluid pressure amplifier system 10 to operate selected valves of the valve system 40 in a manner to be described below and in accordance with an example embodiment to use the nominal pressure of a source hydraulic fluid to operate the hydraulic fluid pressure amplifier system 10 to raise the nominal pressure of the source hydraulic fluid to provide a supply hydraulic fluid having an amplified higher desired pressure in accordance with the example embodiments described herein. The interface device 66 may include a digital input/output device 67 as necessary or desired to provide suitable buffering between the control unit 60 and the valves and other sensors and/or actuatable devices of the hydraulic fluid pressure amplifier system 10 using for example, the plurality of valve control signal lines 20 as a connection between the control unit 60 and the valves of the valve system 40, and using for example other signal communication lines (not shown) between the control unit 60 and the sensors and/or other actuatable devices of the hydraulic fluid pressure amplifier system 10.

Figure 2:
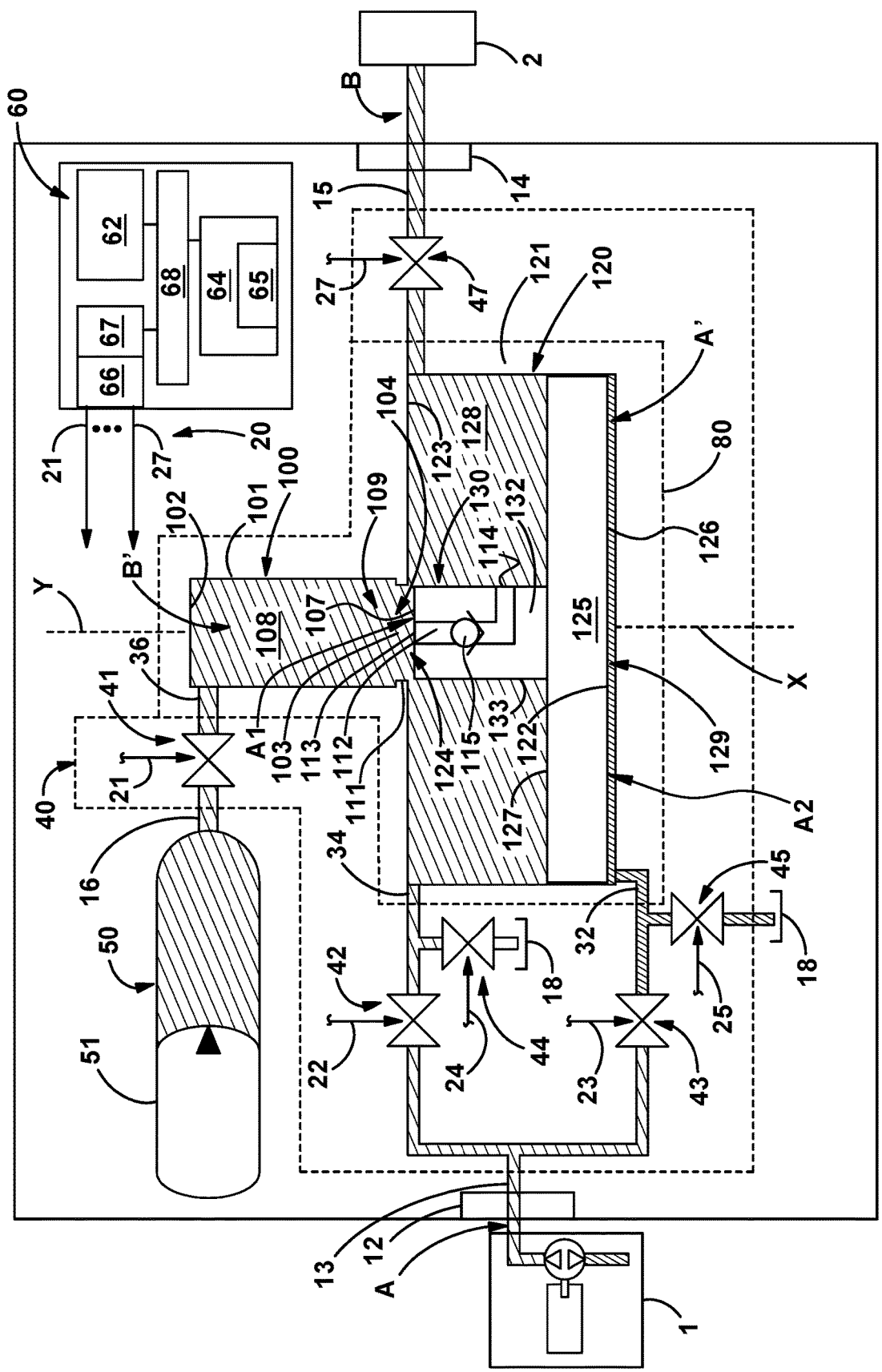
FIG. 2 is a more detailed schematic illustration of the fluid pressure boost system of FIG. 1 in accordance with an example embodiment.

FIG. 2 is a schematic illustration showing a hydraulic fluid pressure amplifier system 10 in accordance with a particular example embodiment. With reference now to that Figure and with continued reference to FIG. 1, the hydraulic fluid pressure amplifier system 10 of the example embodiment includes a boost cylinder assembly 100, a working cylinder assembly 120 operatively connected with the boost cylinder assembly 100, and an energy storage device 50. The boost cylinder assembly 100 includes a boost cylinder 101, defining a blind side volume 108 between opposite high pressure and return ends 102, 103 of the boost cylinder 101. In the example embodiment, the boost cylinder 101 is configured to selectively receive a plunger member 130 into the boost cylinder 101, wherein movement of the plunger member 130 received in the boost cylinder 101 towards the high pressure end 102 of the boost cylinder 101 compresses a charge fluid within the blind side volume 108 of the boost cylinder 101 from a first fluid pressure to an amplified fluid pressure greater than the first pressure. The working cylinder assembly 120 is operatively connected with the boost cylinder assembly 100, and is selectively operable responsive to receiving the source hydraulic fluid A having the nominal fluid pressure less than the amplified fluid pressure for effecting the movement of the plunger member 130 towards the high pressure end 102 of the boost cylinder 101.

The working cylinder assembly 120 of the hydraulic fluid pressure amplifier system 10 of the example embodiment includes a working cylinder 121 and a working cylinder piston 125 disposed in the working cylinder 121. As shown, the working cylinder piston 125 divides the working cylinder 121 into working cylinder volumetric sections including a working side volume 129 configured to receive the source hydraulic fluid A, and a rod side volume 128 in fluid communication with the blind side volume 108 of the boost cylinder 101. As will be described in greater detail below, the pressurized hydraulic fluid B' having the amplified fluid pressure is selectively delivered to the output port 14 operatively coupled with the rod side volume 128 of the working cylinder assembly 120 by the amplified fluid pressure of the portion of the charge fluid stored in the energy storage device 50 being selectively communicated to backfill hydraulic fluid in the rod side volume 128 of the working cylinder assembly 120 via the charge fluid in the blind side volume 108 of the boost cylinder 101 acting on the backfill hydraulic fluid in the rod side volume 128 of the working cylinder assembly 120.

As shown, the boost cylinder 101 defines a blind side volume 108. Also as shown, the working cylinder assembly 120 includes a working cylinder 121 and a working cylinder piston 125 disposed in the working cylinder 121, wherein the working cylinder piston 125 divides the working cylinder 121 into working cylinder volumetric sections comprising a working side volume 129 configured to receive the source hydraulic fluid A, and a rod side volume 128 in fluid communication with the blind side volume 108 of the boost cylinder 101 when the plunger member 130 is retracted. In accordance with an example operation of the embodiment shown, a pressurized hydraulic fluid B' having the amplified fluid pressure is selectively delivered to an output port 14 operatively coupled with the rod side volume 128 of the working cylinder assembly 120 by the amplified fluid pressure of the portion of the charge fluid stored in the energy storage device 50 being selectively communicated to backfill hydraulic fluid in the rod side volume 128 of the working cylinder assembly 120 via the charge fluid in the blind side volume 108 of the boost cylinder 101 acting on the backfill hydraulic fluid in the rod side volume 128 of the working cylinder assembly 120 when the plunger member 130 is retracted.

It is to be appreciated that the pressurized hydraulic fluid B' having the amplified fluid pressure stored in the energy storage device 50 may be conveyed to the associated fluid consumer 2 as the supply hydraulic fluid B via a make-up branch 38 to be described below in greater detail with reference to FIG. 3 as necessary and/or desired, although the make-up branch 38 is optionally provided in the example embodiments described herein and, when provided, is primarily used in the system 10 to make up any oil that may need to be additionally provided to the boost cylinder assembly 100 in order to assure full oil volume in the energy storage device 50. In accordance with the example embodiment when the make-up branch 38 is optionally provided, the valve system 40 yet still further may include a make-up valve 47 (FIGS. 3-8) disposed between the blind side volume 108 of the boost cylinder 101 and a source of hydraulic fluid such as for example, the supply line 15. In this position, the make-up valve 47 is operable to selectively connect or close-off a fluid connection between the source of hydraulic fluid such as for example, the supply line 15 and the blind side volume 108 of the boost cylinder 101.

As described, the working cylinder assembly 120 of the subject hydraulic fluid pressure amplifier system 10 in accordance with the example embodiment includes a working cylinder 121 and a working cylinder piston 125 movable within the working cylinder 121. In particular in accordance with the example embodiment the plunger member 130 and the working cylinder piston 125 are operatively mutually coupled. In that way, movement of the working cylinder piston 125 effects a corresponding movement of the plunger member 130. The relationship between the movement of the working cylinder piston 125 and the movement of the plunger member 130 may be direct such as shown in the example embodiment, or indirect using one or suitable connection member(s) such as for example rods, gear mechanisms, or the like (not shown).

The working cylinder piston 125 of the subject hydraulic fluid pressure amplifier system 10 in accordance with the example embodiment divides the working cylinder 121 into volumetric sections comprising a rod side volume 128 and a working side volume 129. In addition in accordance with the example embodiment, the working cylinder piston 125 is operable responsive to the working cylinder assembly 120 receiving the source hydraulic fluid A into the working side volume 129 of the working cylinder 121 to move the plunger member 130 into the boost cylinder 101 to compress the charge fluid within the blind side volume 108 of the boost cylinder 101. In this way the movement of the working cylinder piston 125 effects a corresponding direct movement of the plunger member 130.

As described above, the relationship between the movement of the working cylinder piston 125 and the movement of the plunger member 130 may be directly related or indirectly related. In the example embodiment as illustrated, the plunger member 130 moves together with the working cylinder piston 125. In particular, in the example shown, the plunger member 130 is carried on the working cylinder piston 125. In addition and as shown, the return end 103 of the boost cylinder 101 defines a boost cylinder aperture 104 configured to selectively receive the plunger member 130 into the blind side volume 108 of the boost cylinder 101 to compress the charge fluid within the blind side volume 108 of the boost cylinder 101 from the first fluid pressure to the amplified fluid pressure greater than the first pressure.

The plunger member 130 may be extended into the blind side volume 108 of the boost cylinder 101 to compress the charge fluid within the blind side volume 108, and the plunger member 130 may be withdrawn from the blind side volume 108 of the boost cylinder 101 to permit pressurized hydraulic fluid having the amplified fluid pressure to be delivered to the output port operatively coupled with the rod side volume of the working cylinder assembly by the amplified fluid pressure of the portion of the charge fluid stored in the energy storage device being communicated to backfill hydraulic fluid in the rod side volume of the working cylinder assembly via the charge fluid in the blind side volume of the boost cylinder acting on the backfill hydraulic fluid in the rod side volume of the working cylinder assembly. A seal member 111 is provided for interfacing the plunger member 130 with the boost cylinder 101. In the example shown, the seal member 111 is disposed on the return end 103 of the boost cylinder, and effects a fluid seal between a boost cylinder aperture 104 and the plunger member 130 received into the blind side volume 108 of the boost cylinder 101.

In addition to the above, the plunger member 130 of the fluid pressure amplifier system 10 according to the example defines a compression side 107 facing the blind side volume 108 of the boost cylinder 101, wherein the compression side 107 has a first surface area A1. Correspondingly, the working cylinder piston 125 defines a low pressure side 126 open to the working side volume 129 of the working cylinder 121. The low pressure side 126 of the working cylinder piston 125 has a second surface area A2 greater than the first surface area A1 of the compression side 107 of the plunger member 130. The working cylinder piston 125 is selectively movable relative to the working cylinder 121 for effecting the movement of the plunger member 130 towards the high pressure end 102 of the boost cylinder 101 responsive to the working cylinder assembly 120 receiving the source hydraulic fluid A into the working side volume 129 of the working cylinder 121.

As described above, plunger member 130 may be extended into the blind side volume 108 of the boost cylinder 101 to compress the charge fluid within the blind side volume 108, and the plunger member 130 may be withdrawn from the blind side volume 108 of the boost cylinder 101. In the example shown, the withdrawal of the plunger member 130 from boost cylinder 101 is effected by injecting backfill fluid into the rod side volume 128 of the working cylinder 121. In order to overcome the effects of possible suction preventing the withdrawal of the plunger member 130 from boost cylinder 101, a fluid relief is provided. In particular, a fluid check valve 115 is carried by the plunger member 130. In this regard, the plunger member 130 defines a passageway 112 open on a first end 113 to the compression side 107 of the plunger member 130 facing the blind side volume 108 of the boost cylinder 101, and open on a second end 114 on a side 133 of the plunger member 130. Further in this regard, the fluid check valve 115 is operable to permit a flow of hydraulic fluid though the passageway 112 from the second end 114 of the passageway 112 to the first end 113 of the passageway 112, and to restrict the flow of hydraulic fluid though the passageway 112 from the first end 113 of the passageway 112 to the second end 114 of the passageway 112.

It is to be appreciated that during use of the hydraulic fluid pressure amplifier system 10 according to the example embodiment, the working cylinder piston 125 is operated to move between opposite working pressure and high pressure ends 122, 123 of the working cylinder 121. In this regard, the working cylinder assembly 120 is configured to alternately receive the source hydraulic fluid A having the nominal fluid pressure less than the amplified fluid pressure into the rod side volume 128 of the working cylinder 121 as backfill fluid to operate the working cylinder piston 125 to move towards the working pressure end 122 of the working cylinder 121, and to receive via the boost cylinder aperture 104 as the compression side 107 of the plunger member 130 withdraws from the boost cylinder aperture 104 the amplified fluid pressure of the charge fluid within the blind side volume 108 of the boost cylinder 101 to pressurize the backfill fluid within the rod side volume 128 of the working cylinder 121 to the amplified fluid pressure to form a pressurized hydraulic fluid B' for selective delivered to an output port 14 of the fluid pressure amplifier system 10 operatively coupled with the working cylinder assembly 120.

It is to be appreciated that in accordance with a preferred operational mode of the subject hydraulic fluid pressure amplifier system 10, the energy storage device 50 is configured to communicate the amplified fluid pressure of the charge fluid within the blind side volume 108 of the boost cylinder 101 to pressurize backfill hydraulic fluid within the rod side volume 128 of the working cylinder 121 from which it may be delivered to the output port 14.

With continued reference to FIG. 2 together with FIG. 1, the plurality of hydraulic cylinder lines 30 in accordance with an example embodiment includes a working cylinder energize line 32 for use in communicating hydraulic fluid between the valve system 40 and the hydraulic cylinder system 80 under the control of the control unit 60 operating the valve system 40 using the plurality of valve control signal lines 20 for actuating a working cylinder assembly to be described below of the hydraulic cylinder system 80 to pressurize the hydraulic fluid in the system 10 by the activation of the working cylinder assembly. The plurality of hydraulic cylinder lines 30 further includes a working cylinder backfill line 34 for use in communicating hydraulic fluid between the valve system 40 and the hydraulic cylinder system 80 under the control of the control unit 60 operating the valve system 40 using the plurality of valve control signal lines 20 for causing a working piston of the hydraulic cylinder system 80 within the working cylinder assembly to move into a selected retracted, initialization, or pre-pressurization position during operation of the hydraulic fluid pressure amplifier system 10 as will be described in greater detail below. In the example embodiment, the working cylinder energize line 32 may be used for selectively communicating hydraulic fluid from the associated fluid source 1 to the hydraulic cylinder system 80 under the control of the control unit 60 operating the valve system 40 using the plurality of valve control signal lines 20 for actuating the working cylinder assembly of the hydraulic cylinder system 80 to pressurize the hydraulic fluid within the energy storage device 50 of the system 10. Also in the example embodiment, the working cylinder backfill line 34 may be used for selectively communicating hydraulic fluid from the associated fluid source 1 to the hydraulic cylinder system 80 under the control of the control unit 60 operating the valve system 40 using the plurality of valve control signal lines 20 for backfilling a portion of the working cylinder assembly such as for example the fluid flow pass-through chamber of the selected portion of the hydraulic cylinder system 80 in a manner and for purposes to be described in greater detail below, and also for selectively releasing a portion of the hydraulic fluid to a return sump 18 in a manner and for purposes to be described in greater detail below.

In accordance with an example embodiment the plurality of hydraulic cylinder lines 30 further includes an energy storage shuttle line 36 for use in communicating hydraulic fluid between a portion of the hydraulic cylinder system 80 to be described in greater detail below and the energy storage device 50 under the control of the control unit 60 operating the valve system 40 using the plurality of valve control signal lines 20. The energy storage shuttle line 36 provides for fluid flow for selectively porting, in one mode of operation of the system 10, the pressurized hydraulic fluid from the selected portion of the hydraulic cylinder system 80 to the energy storage device 50 for storage of the hydraulic fluid having a raised energy in the form of a high pressure hydraulic fluid. The energy storage shuttle line 36 is bidirectional and therefore is also used in the example embodiment in a further mode of operation of the system 10 for selectively porting the pressurized hydraulic fluid as may be necessary or desired from the energy storage device 50 back to the selected portion of the hydraulic cylinder system 80 for selective release of the stored hydraulic fluid having the raised energy from the energy storage device 50 in the form of the high pressure hydraulic fluid to the associated fluid consumer 2 via the hydraulic cylinder system 80 and output port 14.

In operation of the hydraulic fluid pressure amplifier system 10 in a system initialization or pre-charge mode of operation, a pre-charge of hydraulic fluid is filled via the working cylinder backfill line 34 into a rod side volume 128 of the hydraulic cylinder system 80 from the associated fluid source 1 under the control of the control unit 60 operating the valve system 40. This causes a working piston 125 within the working cylinder assembly 120 of the hydraulic cylinder system 80 to move to a selected retracted or initial position such as shown for example in FIG. 3 to be described in greater detail below.

The hydraulic cylinder system 80 may then be actuated in a system charge mode of operation by supplying hydraulic fluid under the nominal source pressure from the associated fluid source 1 via the valve system 40 operating under the control of the control unit 60 to the hydraulic cylinder system 80 via the working cylinder energize line 32. Actuation of the hydraulic cylinder system 80 in this manner generates a high pressure hydraulic fluid within a portion of the hydraulic cylinder system 80 that is ported to the valve system 40 via the energy storage shuttle line 36, and in turn to the energy storage device 50 via the storage communication line 16 and the valve system 40 under the control of the control unit 60 operating the valve system 40 using the plurality of valve control signal lines 20 such as shown for example in FIG. 4 to be described in greater detail below. A selected valve of the valve system 40 may then be exercised by the control unit 60 to temporarily seal off the energy storage device 50 so that the pressurized hydraulic fluid does not escape while the hydraulic cylinder system 80 is returned to an initial disposition, orientation or configuration such as shown for example in FIG. 5 to be described in greater detail below.

For returning the hydraulic cylinder system 80 in a backfill mode of operation of the system 10 to its initial disposition, orientation or configuration after the fluid pressurization pre-charge and charging cycles described above, a further charge of the hydraulic fluid is ported from the associated fluid source 1 as a backfill hydraulic fluid into the hydraulic cylinder system 80 via the valve system 40 and the working cylinder backfill line 34 under the control of the control unit 60 operating the valve system 40 using the plurality of valve control signal lines 20. The working piston 125 of the hydraulic cylinder system 80 is urged during this mode of operation of the system 10 back into its initial start or retracted position within the working cylinder of the hydraulic cylinder system 80. In this regard, the hydraulic fluid supplied under the nominal source pressure through the valve system 40 operating under the control of the control unit 60 to the hydraulic cylinder system 80 via the working cylinder backfill line 34 moves the working piston of the hydraulic cylinder system 80 back into its initial start or retracted position within the working cylinder of the hydraulic cylinder system 80 such as shown for example in FIG. 6 to be described in greater detail below.

After the valve system 40 is exercised during the charging mode of operation by the control unit 60 to pressurize the energy storage device 50 and then to seal off the energy storage device 50 so that the pressurized hydraulic fluid does not escape, and after the working piston within the working cylinder of the hydraulic cylinder system 80 is urged into its initial start or retracted position in the backfill mode of operation of the system 10 as described above, the valve system 40 in accordance with example embodiment is operated under the control of the control unit 60 in a pressure transfer mode of operation to communicate the pressurized hydraulic fluid from the energy storage device 50 to the output port 14 via the energy storage shuttle line 36 and the hydraulic cylinder system 80 arranged in its initial or start disposition.

In this connection, the supply fluid pressure of the pressurized supply hydraulic fluid stored within the energy storage device 50 is communicated to the working hydraulic cylinder assembly to boost the nominal fluid pressure of the source hydraulic fluid backfilled to within the working hydraulic cylinder assembly to the supply fluid pressure greater than the nominal fluid pressure such as shown for example in FIGS. 7 and 8 to be described in greater detail below.

In accordance with an example embodiment, the pressurized supply hydraulic fluid stored within the energy storage device 50 may be applied to and/or otherwise act on or upon the source hydraulic fluid backfilled to within the working hydraulic cylinder assembly by the energy storage device 50 applying the pressurized supply hydraulic fluid via the blind side volume of the boost cylinder to boost the nominal fluid pressure of the source hydraulic fluid A within the working hydraulic cylinder assembly to the supply fluid pressure greater than the nominal fluid pressure.

With continued reference to FIG. 2, the system 10 includes a valve system 40 operatively coupled with the input port 12 via the feed line 13, and the energy storage device 50 operatively coupled with the valve system 40 via the storage communication line 16. In the example, embodiment, the energy storage device 50 is a hydraulic accumulator 52. It is however to be appreciated that other forms of energy storage may be used as may be necessary or desired for receiving and storing pressurized hydraulic fluid for selective controlled release to supply the associated fluid consumer 2.

The hydraulic fluid pressure amplifier system 10 of the example embodiment further includes a control unit 60 operatively coupled with the valve system 40 via a plurality of valve control signal lines 20, and a hydraulic cylinder system 80 operatively coupled between the valve system 40 and the output port 14 via the supply line 15 and plurality of hydraulic cylinder control lines 32, 34, and 36.

Further in the particular example shown in FIG. 2, the plurality of hydraulic cylinder control lines 30 (FIG. 1) includes a working cylinder energize line 32 for use in communicating hydraulic fluid between the valve system 40 and the hydraulic cylinder system 80 under the control of the control unit 60 for actuating a working cylinder assembly 120 of the hydraulic cylinder system 80 to pressurize the hydraulic fluid in the system 10. In the example embodiment, the hydraulic fluid communicated to the working cylinder assembly 120 of the hydraulic cylinder system 80 via the working cylinder energize line 32 causes the working piston 125 of the working cylinder assembly 120 of the hydraulic cylinder system 80 to move into a selected operative position during operation of the hydraulic fluid pressure amplifier system 10 to compress the hydraulic fluid within the system 10 in a manner as will be described in greater detail below.

The plurality of hydraulic cylinder control lines 30 (FIG. 1) of the example embodiment further includes a working cylinder backfill line 34 for use in communicating hydraulic fluid between the valve system 40 and the hydraulic cylinder system 80 under the control of the control unit 60 for causing the working piston 125 of the working cylinder assembly 120 of the hydraulic cylinder system 80 to move into a selected retracted position during operation of the hydraulic fluid pressure amplifier system 10 as described herein.

The plurality of hydraulic cylinder control lines 30 (FIG. 1) of the example embodiment yet further includes an energy storage shuttle line 36 for use in communicating hydraulic fluid between the valve system 40 and the hydraulic cylinder system 80 under the control of the control unit 60.

In the example, the valve system 40 includes a storage valve 41 disposed in fluid communication between the storage communication line 16 and the energy storage shuttle line 36. That is, the storage valve 41 is disposed between the boost cylinder assembly 100 and the energy storage device 50. In this position, the storage valve 41 is operable to selectively connect or close-off a fluid connection between the energy storage device 50 and the hydraulic cylinder system 80. In the example, the storage valve 41 is responsive to a storage valve signal 21 of the plurality of valve control signal lines 20 from the control unit 60 for operating to selectively connect or close-off a fluid connection between the energy storage device 50 and the hydraulic cylinder system 80. That is, the storage valve 41 is responsive to the storage valve signal 21 to open to permit a flow of the charge fluid having the amplified fluid pressure between the blind side volume 108 of the boost cylinder assembly 100 and the energy storage device 50 for the energy storage device 50 to selectively receive and store the portion of the charge fluid compressed to the amplified fluid pressure.

In the example embodiment, the logic 65 of the control system 60 is executable by the processor device 62 to cause the hydraulic fluid pressure amplifier system 10 to selectively generate the storage valve signal 21 to operate the storage valve 41 to open to permit the flow of the flow of the charge fluid having the amplified fluid pressure between the blind side volume 108 of the boost cylinder assembly 100 and the energy storage device 50.

The valve system 40 further includes an actuate valve 43 disposed between the working cylinder assembly 120 and the associated fluid source 1 providing the source hydraulic fluid A to the hydraulic fluid pressure amplifier system 10. In the example embodiment, the actuate valve 43 is responsive to an actuate valve signal 23 to open to permit a flow of the source hydraulic fluid A into the working side volume 129 of the working cylinder assembly 120 from the associated fluid source 1 to operate the working cylinder piston 125 to move the plunger member 130 into the boost cylinder 101 to compress the charge fluid within the blind side volume 108 of the boost cylinder 101.

In the example embodiment, the logic 65 of the control system 60 is executable by the processor device 62 to cause the hydraulic fluid pressure amplifier system 10 to selectively generate the actuate valve signal 23 to operate the actuate valve 43 to open to permit the flow of the source hydraulic fluid A into the working side volume 129 of the working cylinder assembly 120 from the associated fluid source 1.

The valve system 40 further includes a backfill valve 42 disposed between the feed line 13 and the working cylinder backfill line 34. In this position, the backfill valve 42 is operable to selectively connect or close-off a fluid connection between the associated fluid source 1 and the hydraulic cylinder system 80. In the example, the backfill valve 42 is responsive to a backfill valve signal 22 of the plurality of valve control signal lines 20 from the control unit 60 for operating to selectively connect or close-off a fluid connection between the associated fluid source 1 and the hydraulic cylinder system 80. That is, in the example embodiment shown, the backfill valve 42 is disposed between the working cylinder 121 and the associated fluid source 1, and is responsive to the backfill valve signal 22 to open to permit a flow of a backfill hydraulic fluid into the rod side volume 128 of the working cylinder assembly 120 from the associated fluid source 1, wherein the logic 65 of the control unit is executable by the processor device 62 to cause the hydraulic fluid pressure amplifier system 10 to selectively generate the backfill valve signal 22 to operate the backfill valve 41 to open to permit the flow of the backfill hydraulic fluid into the rod side volume 128 of the working cylinder assembly 120 from the associated fluid source 1.

In accordance with the example embodiment shown, the logic 65 of the control unit 60 is executable by the processor device 62 to sequentially generate the backfill valve signal 22, the actuate valve signal 23, and the storage valve signal 21, to sequentially operate the backfill valve 42, the actuate valve 43, and the storage valve 41 to render from the working cylinder assembly 120, based on the source hydraulic fluid A having the nominal fluid pressure, a pressurized hydraulic fluid B' having the amplified fluid pressure for selective delivered to an output port 14 of the fluid pressure amplifier system 10 operatively coupled with the working cylinder assembly 120.

The valve system 40 still further includes a fill return valve 44 disposed between the working cylinder backfill line 34 and the hydraulic return sump 18 of the system 10. In this position, the fill return valve 44 is operable to selectively connect or close-off a fluid connection between the working cylinder backfill line 34 and the return sump 18. In the example, the fill return valve 44 is responsive to a fill valve signal 24 of the plurality of valve control signal lines 20 from the control unit 60 for operating to selectively connect or close-off a fluid connection between the working cylinder backfill line 34 and the return sump 18.

The valve system 40 yet still further includes an actuate return valve 45 disposed between the working cylinder energize line 32 and the return sump 18. In this position, the actuate return valve 45 is operable to selectively connect or close-off a fluid connection between the working cylinder energize line 32 and the return sump 18. In the example, the actuate return valve 45 is responsive to an actuate return valve signal 25 of the plurality of valve control signal lines 20 from the control unit 60 for operating to selectively connect or close-off a fluid connection between the working cylinder energize line 32 and the return sump 18.

The valve system 40 yet still further includes an optional payout valve 46 (FIG. 3) disposed in the supply line 15 between the rod side volume 128 of the hydraulic cylinder system 80 and the output port 14. In this position, the optional payout valve 46 is operable to selectively connect or close-off a fluid connection between the rod side volume 128 of the hydraulic cylinder system 80 and the output port 14 for selectively feeding the hydraulic fluid having the high pressure raised by the hydraulic fluid pressure amplifier system 10 of the example embodiment to the associated fluid consumer 2. In the example, the optional payout valve 46 is responsive to a pressure payout signal 26 of the plurality of valve control signal lines 20 from the control unit 60 for operating to selectively connect or close-off a fluid connection between the rod side volume 128 of the hydraulic cylinder system 80 and the output port 14.

In accordance with an example embodiment, a make-up branch 38 (FIG. 3) may be provided as necessary and/or desired, although the make-up branch 38 is optionally provided in the example embodiments described herein and, when provided, is primarily used in the system 10 to make up any oil that may need to be additionally provided to the boost cylinder assembly 100 in order to assure full accumulator 52 oil volume. In accordance with the example embodiment when the make-up branch 38 is optionally provided, the valve system 40 yet still further may include a make-up valve 47 (FIG. 3) disposed between the blind side volume 108 of the boost cylinder 101 and a source of hydraulic fluid such as for example, the supply line 15. In this position, the make-up valve 47 is operable to selectively connect or close-off a fluid connection between the source of hydraulic fluid such as for example, the supply line 15 and the blind side volume 108 of the boost cylinder 101. In the example, the make-up valve 47 is responsive to a make-up valve signal 27 of the plurality of valve control signal lines 20 from the control unit 60 for operating to selectively connect or close-off a fluid connection between the blind side volume 108 of the boost cylinder 101 and a source of hydraulic fluid such as for example, the supply line 15. It is to be appreciated that the make-up branch 38 may connect the blind side volume 108 of the boost cylinder 101 with any source of hydraulic fluid and as such is not limited to connection with the supply line 15 for replenishing any oil that may leak in order to assure full accumulator 52 oil volume. For example, the make-up branch 38 may couple the boost cylinder 101 with the feed line 13 for replenishing the blind side volume 108 of the boost cylinder 101 using the source hydraulic fluid A from the associated fluid source 1.

In the example embodiment and as shown, the hydraulic cylinder system 80 comprises, in general, a boost cylinder assembly 100 and a working cylinder assembly 120. The boost and working cylinder assemblies 100, 120 are mutually co-operable to generate or otherwise develop the supply hydraulic fluid B at the boosted hydraulic pressure greater than the nominal pressure of the received source hydraulic fluid A and, in the example embodiment are arranged in a "cascade" or "stacked" arrangement as will be explained below. In general, however, the boost and working cylinder assemblies 100, 120 are operable by the valve system 40 under the direction of the control unit 60 in a coordinated and cooperative manner to be described below to amplify the pressure of the hydraulic fluid received from the associated source 1 via the input port 12 to a substantially higher pressure for delivery to the associated hydraulic fluid consumer 2 via the output port 14. In general, however, the 120 is operated by the control unit 60 to use the source hydraulic fluid A at the nominal hydraulic fluid pressure to in turn operate the boost cylinder assembly 100 which in turn develops the supply hydraulic fluid B at the boosted hydraulic pressure greater than the nominal pressure.

In the example embodiment, the boost cylinder assembly 100 includes a hollow boost cylinder 101 having a high pressure end 102 and return end 103. The return end 103 has a boost cylinder aperture 104 located at or near to its center. The aperture 104 has sufficient diameter to substantially align and selectively loosely receive a plunger member 130 in the form of a cylindrical working rod 132 of the working cylinder assembly 120 in a manner to be described below. In the example embodiment, the cylindrical working rod 132 is selectively received in the boost cylinder aperture 104 in a sealed manner to prevent a flow of fluid between the outer diameter of the cylindrical working rod 132 and the inner diameter of the boost cylinder aperture 104. The high pressure end 102 of the boost cylinder 101 is in fluid communication with the energy storage device 50 by means of the energy storage shuttle line 36 and the storage communication line 16.

The boost cylinder 101 defines a volumetric section including a blind side volume 108 of the boost cylinder 101, with the volume of this section varying with the movement of the plunger member 130 within the boost cylinder 101. In the example embodiment, the blind side volume 108 of the cylinder 101 is in fluid communication with the energy storage device 50 by means of the energy storage shuttle line 36 and the storage communication line 16 via the storage valve 41. In that way, hydraulic fluid may flow between the blind side volume 108 of the boost cylinder 101 and the energy storage device 50 in accordance with the opened or closed condition of the storage valve 41. The plunger member 130 may comprise any configuration which fits within the inner diameter of the boost cylinder 101. In addition, one or more seal member(s) 111 are provided and as shown, are disposed on the return end 103 of the boost cylinder, wherein the seal member 111 effects a fluid seal between the boost cylinder aperture 104 and the plunger member 130 received into the blind side volume 108 of the boost cylinder 101. This precludes or minimizes oil flow from the blind side volume 108 of the cylinder 101 to the rod side volume 128 of the working cylinder 121 and visa-versa, and such that it exhibits stability with relation to its position in the bore upon the application of pressure to the plunger member 130 such as for example, by application of pressure received from the working cylinder assembly 120 in a manner to be described below. In the example embodiment, the plunger member 130 comprises a substantially solid cylindrical working rod 132 of outer diameter substantially equal to the inner diameter of boost cylinder 101.

In order to overcome the effects of possible suction preventing the withdrawal of the plunger member 130 from boost cylinder 101, a fluid relief is provided. In particular, a fluid check valve 115 is carried by the plunger member 130. In this regard, the plunger member 130 defines a passageway 112 open on a first end 113 to the compression side 107 of the plunger member 130 facing the blind side volume 108 of the boost cylinder 101, and open on a second end 114 on a side 133 of the plunger member 130. Further in this regard, the fluid check valve 115 is operable to permit a flow of hydraulic fluid though the passageway 112 from the second end 114 of the passageway 112 to the first end 113 of the passageway 112, and to restrict the flow of hydraulic fluid though the passageway 112 from the first end 113 of the passageway 112 to the second end 114 of the passageway 112. a fluid check valve 115 carried by the plunger member 130.

During operation, motion of the plunger member 130 is effected upwardly as viewed in the drawing from the return end 103 of the boost cylinder 101 to the high pressure end 102 of the boost cylinder 101 with the storage valve 41 in its opened configuration to thereby compress the hydraulic fluid within the blind side volume 108 into the energy storage device 50. The movement of the plunger member 130 from the return end 103 of the boost cylinder 101 to the high pressure end 102 of the boost cylinder 101 generates the highly compressed hydraulic fluid B' within the blind side volume 108 of the boost cylinder 101 and in turn within the energy storage device 50. The storage valve 41 may then be closed to store the highly compressed hydraulic fluid B' within the energy storage device 50 for selective release of the stored hydraulic fluid having the raised energy in the form of the high pressure hydraulic fluid for subsequent use by the associated fluid consumer 2.

With continued reference to FIG. 2, in addition to the working piston 125, the working cylinder assembly 120 further includes a hollow working cylinder 121 operably connected with the boost cylinder 101 substantially in a manner as shown. The working cylinder 121 and the boost cylinder 101 are connected in a manner that the working cylinder 121 and the boost cylinder 101 are in general in mutual alignment with each other. In the example embodiment, the working cylinder 121 and the boost cylinder 101 are mutually axially arranged or otherwise aligned. Further in the example embodiment, portions of the working and boost cylinders 121, 101 are mutually radially arranged or otherwise aligned. In the example embodiment and in particular, the working cylinder 121 is coupled with the boost cylinder 101 in a manner that a longitudinal axis X defined by the working cylinder 121 and a longitudinal axis Y defined by the boost cylinder 101 are in parallel with each other. In the example embodiment, the longitudinal axes X, Y of the boost and working cylinders 101, 121 are mutually co-extensive.

In accordance with an example embodiment the working cylinder 121 comprises a working pressure end 122 and a high pressure end 123, wherein the high pressure end 123 defines a working rod aperture 124. The diameter of the working rod aperture 124 is substantially equal to the diameter of the boost cylinder aperture 104, and is in general alignment with the longitudinal axis X defined by the working cylinder 121 and with the longitudinal axis Y defined by the boost cylinder 101. Preferably, the diameter of the working rod aperture 124 is the same as the diameter of the boost cylinder aperture 104, and is in alignment with the longitudinal axes X, Y defined by the working and boost cylinders 121, 101. Also preferably, the a seal member 111 disposed on the return end 103 of the boost cylinder at the boost cylinder aperture 104, whereat the seal member 111 may effect a fluid seal between the boost cylinder aperture 104 and the plunger member 130 when the plunger member 130 is received into the blind side volume 108 of the boost cylinder 101.

The working cylinder 121 further comprises a working piston 125 having a low pressure side 126 and a high pressure side 127 with the low pressure side 126 corresponding to the working pressure end 122 of the working cylinder 121, and the high pressure side 127 corresponding to the high pressure end 123 of the working cylinder 121.

In the example embodiment, the working piston 125 divides working cylinder 121 into two volumetric sections including a rod side volume 128 of the cylinder 121, and a working side volume 129 of the cylinder 121, with the volumes of these two sections varying with the movement of the working piston 125 within the working cylinder 121. In the example embodiment, the rod side volume 128 of the working cylinder 121 is in fluid communication with the blind side volume 108 of the boost cylinder 101 by means of a fluid communication between the working rod aperture 124 and the boost cylinder aperture 104. In that way, hydraulic fluid may flow between the rod side volume 128 of the working cylinder 121 and the blind side volume 108 of the boost cylinder 101.

A plunger member 130 is provided on the high pressure side 127 of the working piston 125 and is comprised of a cylindrical working rod 132 extending perpendicularly from the center of working piston 125. In the example embodiment, the plunger member 130 is secured to the high pressure side 127 of the working piston 125 such as by using fasteners or the like, but it also may be formed integrally with the working piston 125. In addition and in accordance with the example embodiment, the plunger member 130 is comprised of a substantially solid circular cylindrical rod 132 extending perpendicularly from the center of working piston 125. The width of the working rod 132 is selected so that its diameter is smaller than the inner diameters of the working rod and boost cylinder apertures 124, 104. In that way, the working rod 132 may easily pass through the working cylinder 121 as it is carried on the working piston 125 to abut against the seal member 111 to effect a fluid seal between the boost cylinder aperture 104 and the plunger member 130 received into the blind side volume 108 of the boost cylinder 101 as the working piston 125 and the plunger member 130 move towards the high pressure end 123 of the working cylinder 121. The length of plunger member 130 is selected to be sufficient so that when the high pressure side 127 of the working piston 125 is abutted against the high pressure end 123 of the working cylinder 121, the plunger member 130 will have been pushed substantially to the high pressure end 102 of the boost cylinder 101. This, in turn, will cause the plunger member 130 to fully compress the hydraulic fluid within the blind side volume 108 and thereby to urge the compressed fluid into the energy storage device 50 based on the opened or closed-off state of the storage valve 41. In the example embodiment, the storage valve 41 is in an opened configuration during the movement of the plunger member 130 towards the high pressure end 102 and upwardly as viewed in the Figure. The storage valve 41 in the opened configuration responsive to the storage valve signal 21 received from the control unit 60 permits the transfer and flow of fluid between the energy storage device 50 and the blind side volume 108 of the boost cylinder 101.

In the example embodiment, the inner diameter of the working cylinder 121 is substantially equal to the outer diameter of the working piston 125 so that flow between one side of the working piston 125 and the other side is minimized or precluded entirely. In that way, the fluids contained in the rod side volume 128 and the working side volume 129 of the working cylinder 121 are not intermingled.

Prior to system initialization and/or pre-charging of the system 10, the fluid pressure in the various volumes of the system may be, for example, about a drain pressure of about 0 psi. By way of example and not for purposes of limiting the embodiments, the pressure in the energy storage device 50 may be about 0 psi, the pressure in the blind side volume 108 of the boost cylinder 101 may be about 0 psi, the pressure in rod side volume 128 of the working cylinder assembly 120 may be about 0 psi, the pressure in working side volume 129 of the working cylinder assembly 120 may be about 0 psi, and the pressure in an auxiliary accumulator device 54 may be about 0 psi.

System Initialization/Pre-Charge

Figure 3:
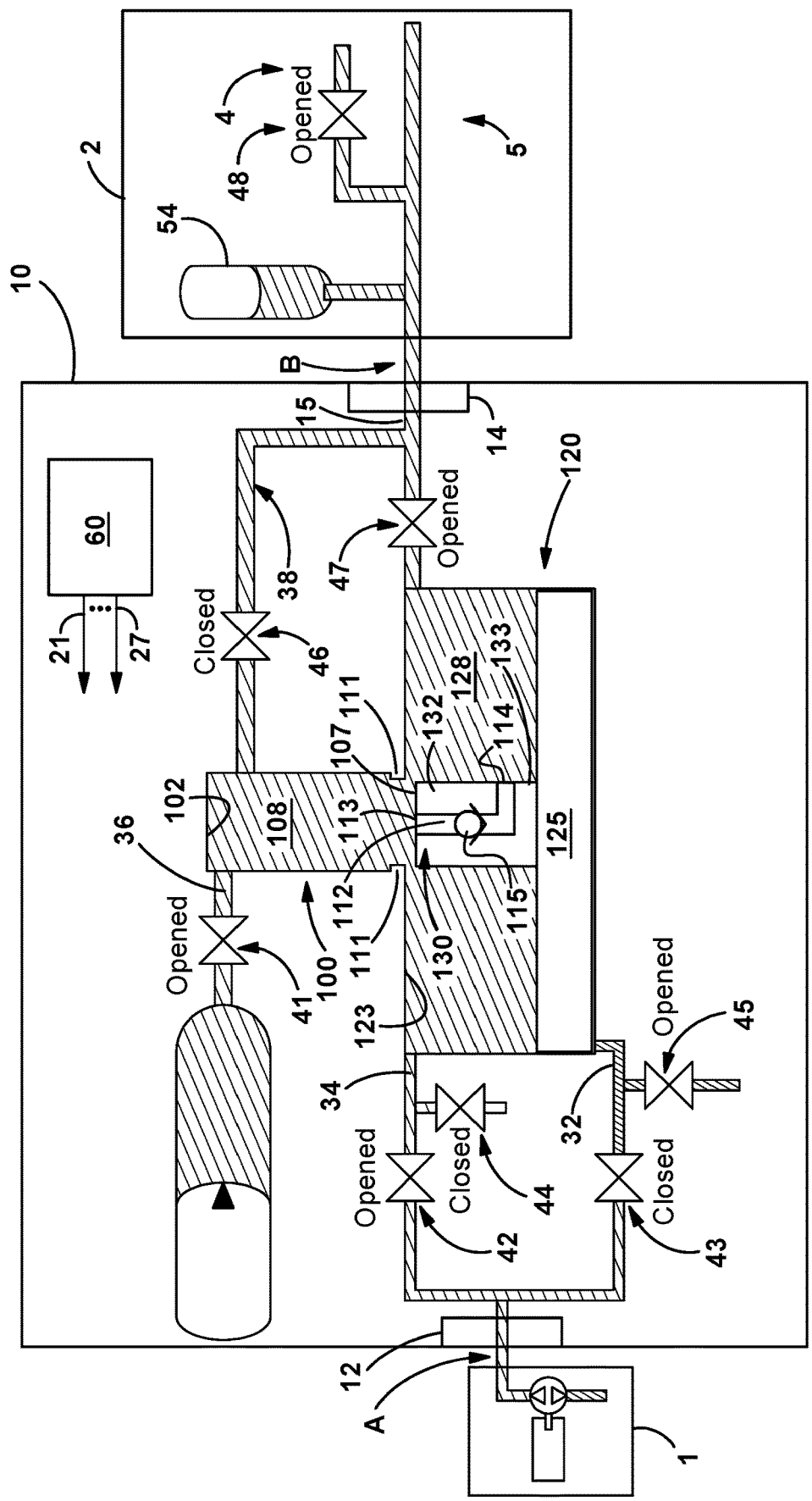
FIG. 3 is a schematic representation of the fluid pressure boost system of FIGS. 1 and 2 showing arrangements and conditions of components of the system when operated in a system initialization mode of operation in accordance with an example embodiment.

In accordance with the example embodiment and with reference now to FIG. 3, the control unit 60 controls the valve system 40 in a manner that the system 10 may be initialized in order to move the working piston 125 to the working pressure end 122 of the working cylinder 121. This allows the plunger member 130 to withdraw from the boost cylinder 101. With the working piston 125 and plunger member 130 moved to this position, the system 10 is set up to receive hydraulic fluid into the appropriate volume areas of the boost system assembly 100 for initiating (or sustaining repeated) operation. In accordance with the example embodiment shown in the Figure, a make-up branch 38 may be provided as necessary and/or desired, although the make-up branch 38 is optionally provided in the example embodiments described herein and, when provided, is primarily used in the system 10 to make up any oil that may need to be additionally provided to the boost cylinder assembly 100 in order to assure full accumulator 52 oil volume. In accordance with the example embodiment when the make-up branch 38 is optionally provided, the valve system 40 yet still further may include a make-up valve 47 operated by the logic levels of the plurality of valve control signal lines 20 generated by the processor device 62 of the control unit 60 executing the control logic 65. In the example, the make-up valve 47 is responsive to the make-up valve signal 27 of the plurality of valve control signal lines 20 from the control unit 60 for operating to selectively connect or close-off a fluid connection between the blind side volume 108 of the boost cylinder 101 and a source of hydraulic fluid such as for example, the supply line 15. In addition in the example embodiment shown in the Figure, the optional payout valve 46 is provided for sealing off the fluids within the working cylinder assembly 120 from the outlet port 14. In further addition and downstream of the make-up branch 38, the example embodiment shown in the Figure includes an auxiliary accumulator device 54 for storing pressurized fluid for operating the associated fluid consumer 2 such as for example an associated fluid consumer 2 comprising an associated lubrication fluid consumer 4 and an associated transmission clutch fluid consumer 5. Yet still further in accordance with the example embodiment shown in the Figure, a lube valve 48 is provided for controlling delivery of the pressurized fluid from the system to the associated lubrication fluid consumer 4, wherein the lube valve 48 is operated by the logic levels of the plurality of valve control signal lines 20 generated by the processor device 62 of the control unit 60 executing the control logic 65.

The system 10 is moved to an initialization or initial disposition, orientation or configuration in preparation for the system 10 being operated to increase or otherwise amplify the pressure of the source hydraulic fluid A received from an associated fluid source 1 under the nominal first pressure to the desired raised second pressure greater than the first pressure for delivery of the hydraulic fluid having the amplified second pressure as the high pressure supply hydraulic fluid B in accordance with the example embodiment. For this in the example, the valve system 40 is operated by the logic levels of the plurality of valve control signal lines 20 generated by the processor device 62 of the control unit 60 executing the control logic 65 to assume the conditions set out in Table I below.

TABLE I

| System Initialization/Pre-Charge | |
|---|---|
| Storage Valve (41) | Opened |
| Fill Valve (42) | Opened |
| Actuate Valve (43) | Closed |
| Fill Return Valve (44) | Closed |
| Actuate Return Valve (45) | Opened |
| Make-Up Valve (46) (optional) | Closed |
| Pay-Out Valve (47) | Opened |
| Lube Valve (48) | Opened |

With the fill valve 42 opened based on the logic level of the fill valve signal 42 received from the control unit 60 and with the actuate valve 43 closed based on the logic level actuate valve signal 23 received from the control unit 60, the source hydraulic fluid A is delivered to the rod side volume 128 of the working cylinder 121 urging the working piston 125 to move towards and to the working pressure end 122 of the working cylinder 121, wherein the working piston 125 carries the plunger membered 130 downwardly as viewed in the Figure and withdrawn and away from the blind side volume 108 of the boost cylinder 101. Also during system initialization, the fill return valve 44 is closed based on the logic level of the fill return valve signal 24 received from the control unit 60 to prevent the source hydraulic fluid A from escaping into the return sump 18. In addition, the actuate return valve 45 is opened based on the actuate return valve signal 25 from the control unit 60 to allow the hydraulic fluid in the working side volume 129 to escape to the return sump 18.

System initialization is complete when the working piston 125 is moved to the working pressure end 122 or downwardly as viewed in the Figure, and when the rod side volume 128 of the working cylinder assembly 120 is fully filled with the source hydraulic fluid A received from the associated fluid source 1.

Following system initialization and/or the pre-charging of the system 10, the fluid pressure in the various volumes of the system may be, for example, about the low pressure delivered by the associated fluid source 1 of about 70 psi. By way of example and not for purposes of limiting the embodiments, following system initialization, the pressure in the energy storage device 50 may be about 70 psi, the pressure in the blind side volume 108 of the boost cylinder 101 may be about 70 psi, the pressure in rod side volume 128 of the working cylinder assembly 120 may be about 70 psi, the pressure in working side volume 129 of the working cylinder assembly 120 may be about 0 psi, and the pressure in an auxiliary accumulator device 54 may be about 70 psi.

System Charging

Figure 4:
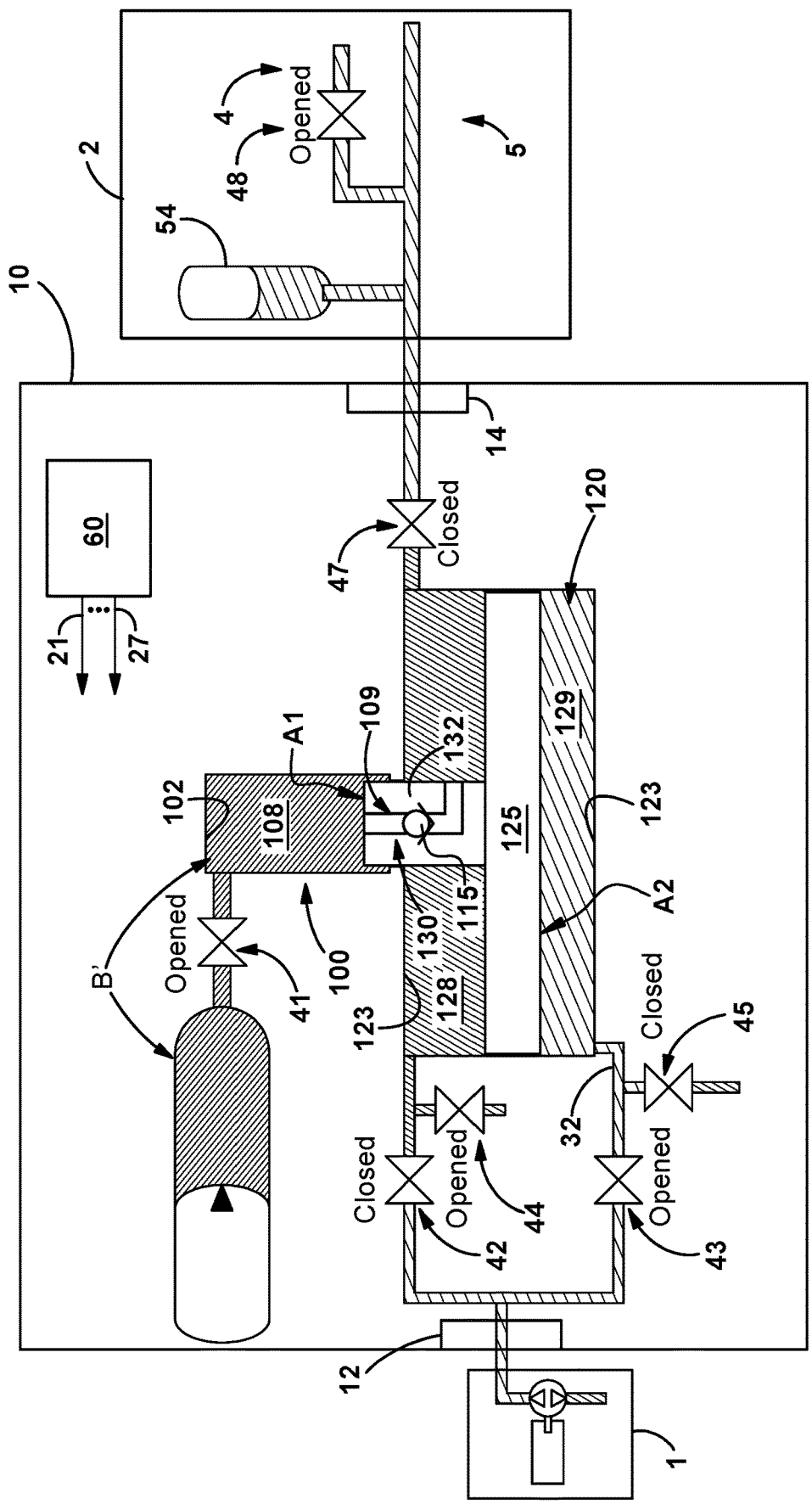
FIG. 4 is a schematic representation of the fluid pressure boost system of FIGS. 1 and 2 showing arrangements and conditions of the components of the system when operated in a system charging mode of operation in accordance with an example embodiment.

In accordance with the example embodiment and with reference now to FIG. 4, the control unit 60 controls the valve system 40 in a manner that the system 10 may be charged in order to compress the hydraulic fluid in the blind side volume 108 and to store the compressed fluid in the energy storage device 50. For this in the example, the valve system 40 is operated by the plurality of valve control signal lines 20 generated by the processor device 62 of the control unit 60 executing the control logic 65 to assume the conditions set out in Table II below.

TABLE II

| System Charging | |
| --- | --- |
| Storage Valve (41) | Opened |
| Fill Valve (42) | Closed |
| Actuate Valve (43) | Opened |
| Fill Return Valve (44) | Opened |
| Actuate Return Valve (45) | Closed |
| Make-Up Valve (46) (optional) | Closed |
| Pay-Out Valve (47) | Closed |
| Lube Valve (48) | Opened |

With the actuate valve 43 opened and the backfill valve 42 closed based on the actuate valve signal 23 and the backfill valve signal 22 generated by the processor device 62 of the control unit 60 executing the control logic 65, the source hydraulic fluid A is permitted to enter into the working side volume 129 of the working cylinder 121 to urge the working piston 125 upwardly as viewed in the Figure and towards the high pressure end 123 of the 121. The actuate return valve 45 is closed based on the actuate return valve signal 25 from the control unit 60 to prevent the source hydraulic fluid A from entering into the return sump 18, but the fill return valve 44 is opened based on the fill valve signal 24 from the control unit 60 to allow for the fluid within the rod side volume 128 of the working cylinder 121 to escape to the return sump 18, thereby allowing the working piston 125 to move upwardly as viewed and towards the high pressure end 123 of the 121.

Further with regard to the system charging condition, the storage valve 41 is opened based on the storage valve signal 21 from the control unit 60 to allow the hydraulic fluid within the blind side volume 108 to enter into the energy storage device 50 via the storage communication line 16 and the energy storage shuttle line 36. In this regard it is to be appreciated that in the charging operation, the plunger member 130 enters into the working cylinder 121 through the boost cylinder aperture 104 as the working piston 125 advances towards the high pressure end 123 of the working cylinder 121. In this way, the movement of the working piston 125 carrying the plunger member 130 therewith in turn urges the plunger member 130 upwardly as viewed in the Figure thereby compressing the hydraulic fluid within the blind side volume 108 into to the energy storage device 50 as a highly compressed hydraulic fluid B'.

It is to be appreciated that the plunger member 130 defines a compression side 107 facing the blind side volume 108 of the boost cylinder 101, and that the working cylinder piston 125 defines a low pressure side 126 open to the working side volume 129 of the working cylinder 121 and having a second surface area A2. It is further to be appreciated that surface area A2 of the working piston 125 is substantially larger than the surface area A1 of the compression side 107 of plunger member 130 and, in that way, the fluid within the blind side volume 108 of the boost cylinder 101 may be compressed to a level having a pressure substantially above the pressure level of the source hydraulic fluid A filling in the working side volume 129 and actuating the working piston 125.

During the charging of the system 10, the fluid pressure in the various volumes of the system may be substantially and advantageously different. By way of example and not for purposes of limiting the embodiments, following system charging, the pressure in the energy storage device 50 may be about 400 psi, the pressure in the blind side volume 108 of the boost cylinder 101 may be about 400 psi, the pressure in rod side volume 128 of the working cylinder assembly 120 may be about 0 psi, the pressure in working side volume 129 of the working cylinder assembly 120 may be about 70 psi, and the pressure in an auxiliary accumulator device 54 may be about 70 psi.

System Holding Charge

Figure 5:
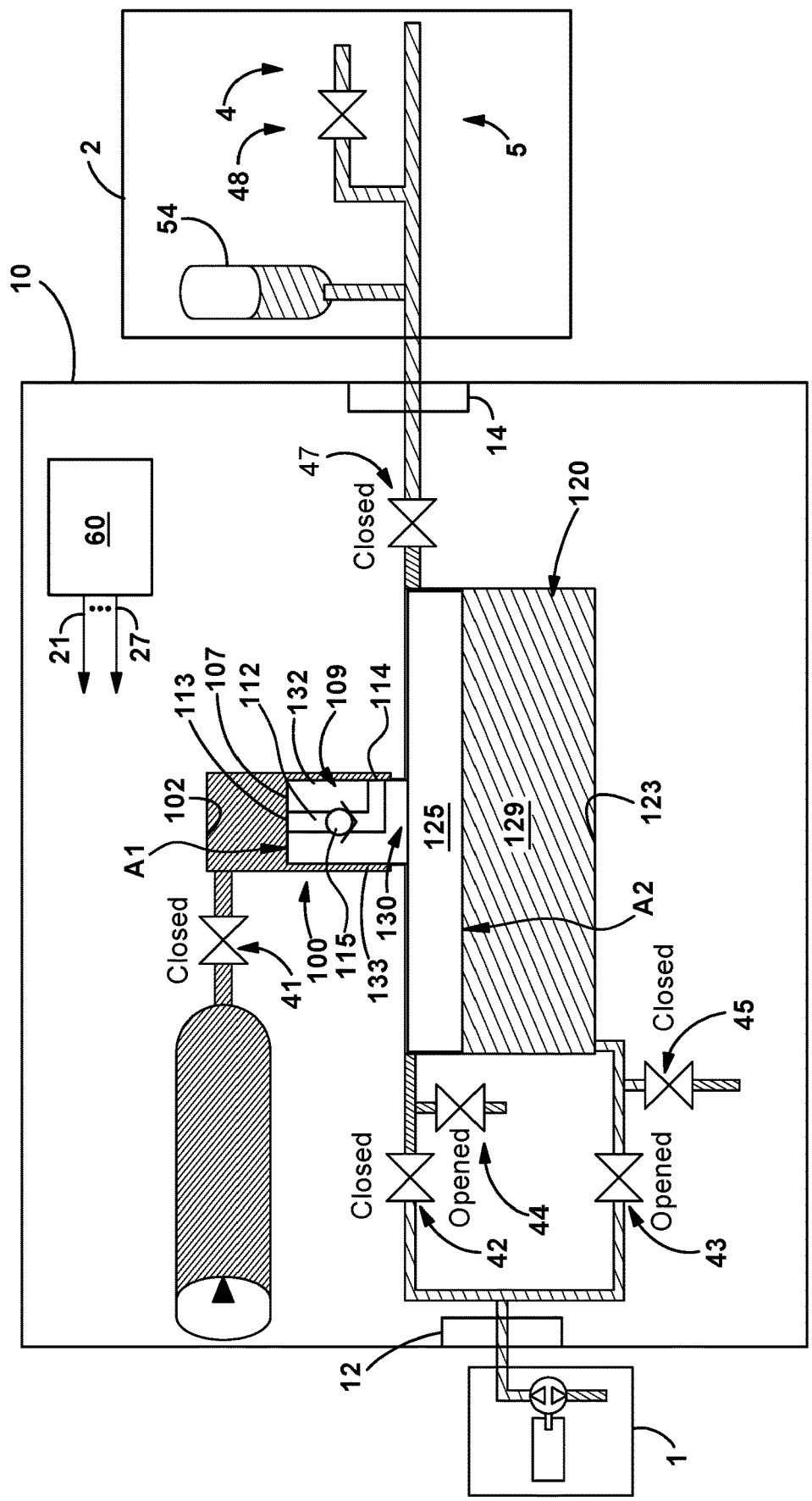
FIG. 5 is a schematic representation of the fluid pressure boost system of FIGS. 1 and 2 showing arrangements and conditions of the components of the system when operated in a system holding charge mode of operation in accordance with an example embodiment.

In accordance with the example embodiment and with reference now to FIG. 5, the control unit 60 controls the valve system 40 in a manner that the system 10 may be operated in order to hold or otherwise store the compressed hydraulic fluid in the energy storage device 50. For this in the example, the valve system 40 is operated by the plurality of valve control signal lines 20 generated by the processor device 62 of the control unit 60 executing the control logic 65 to assume the conditions set out in Table III below.

TABLE III

| System Charge Holding | |
| --- | --- |
| Storage Valve (41) | Closed |
| Fill Valve (42) | Closed |
| Actuate Valve (43) | Opened |
| Fill Return Valve (44) | Opened |
| Actuate Return Valve (45) | Closed |
| Make-Up Valve (46) (optional) | Closed |
| Pay-Out Valve (47) | Closed |
| Lube Valve (48) | Opened |

With the storage valve 41 closed based on the storage valve signal 21 from the energy storage device 50, the highly pressurized hydraulic fluid B' is locked in place within the energy storage device 50.

After the high pressure hydraulic fluid B' is locked in place by the closing of the storage valve 41 based on the storage valve signal 21 from the control unit 60, selected portions of the remainder of the hydraulic cylinder system 80 may be moved into place so that the pressure of the highly pressurized fluid B' may be moved back through the hydraulic cylinder system 80 so that it may be delivered to the associated fluid consumer 2 via the output port 14.

In a further example embodiment, the storage communication line 16 may be connected with an auxiliary output port (not shown) for purposes of permitting the compressed hydraulic fluid within the energy storage device 50 to be directly siphoned off by an associated fluid consuming device other than the associated fluid consumer 2 as may be necessary or desired.

Following the charging of the system 10 (system at full charge), the fluid pressure in the various volumes of the system may be substantially and advantageously different. By way of example and not for purposes of limiting the embodiments, following system charging, the pressure in the energy storage device 50 may be about 600 psi, the pressure in the blind side volume 108 of the boost cylinder 101 may be about 600 psi, the pressure in rod side volume 128 of the working cylinder assembly 120 may be about 0 psi, the pressure in working side volume 129 of the working cylinder assembly 120 may be about 70 psi, and the pressure in an auxiliary accumulator device 54 may be about 70 psi.

System Backfill

Figure 6:
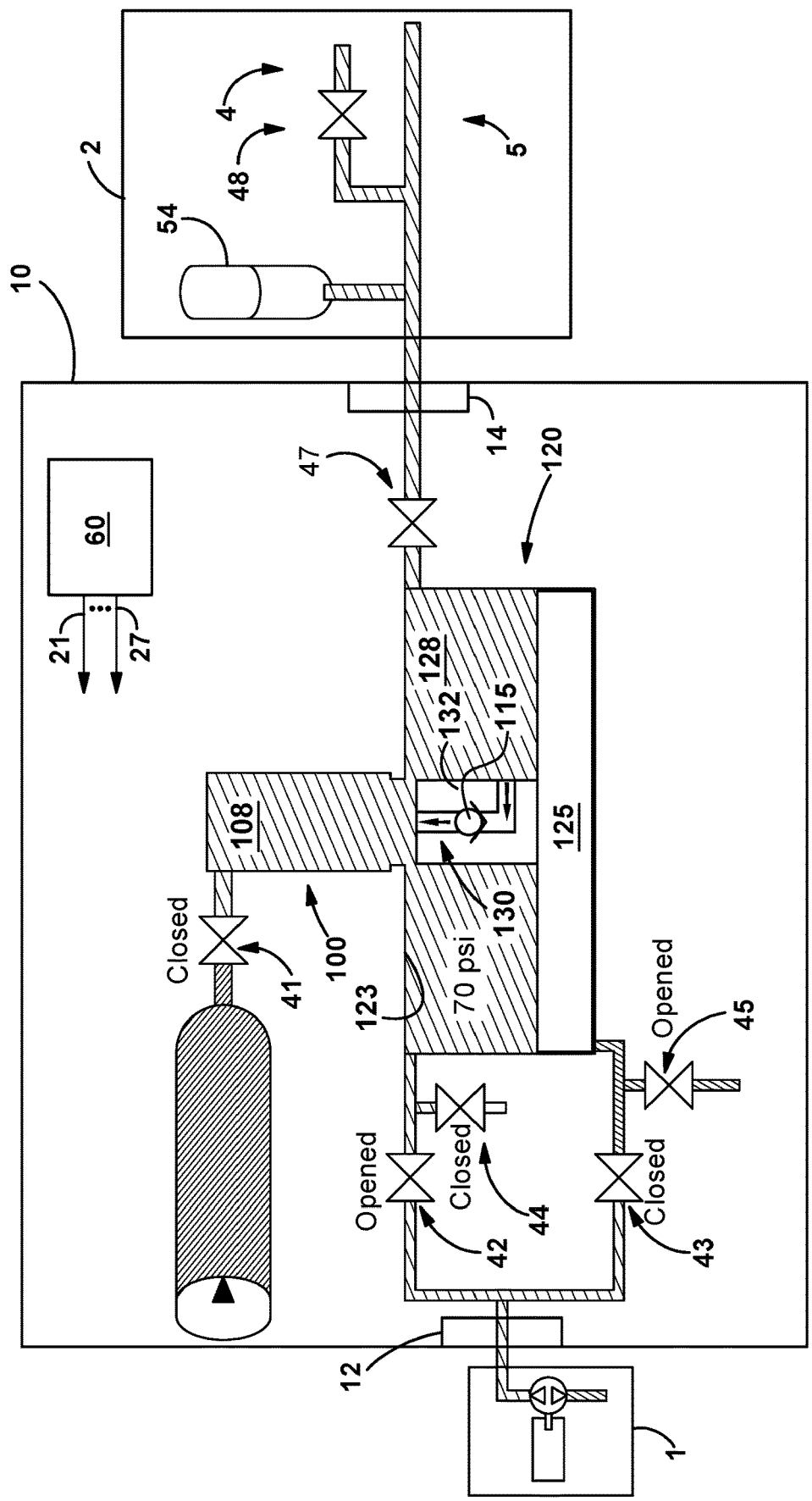
FIG. 6 is a schematic representation of the fluid pressure boost system of FIGS. 1 and 2 showing arrangements and conditions of the components of the system when operated in a system backfill mode of operation in accordance with an example embodiment.

In accordance with the example embodiment and with reference now to FIG. 6, the control unit 60 controls the valve system 40 in a manner that the system 10 may be operated under the control of the control unit 60 to prepare for permitting the pressure of the highly compressed hydraulic fluid B' stored within the energy storage device 50 to be selectively released to the associated fluid consumer 2 via the output port 14. For this in the example, the valve system 40 is operated by the plurality of valve control signal lines 20 generated by the processor device 62 of the control unit 60 executing the control logic 65 to assume the conditions set out in Table IV below.

TABLE IV

System Backfill

| Storage Valve (41) | Closed |
|---|---|
| Fill Valve (42) | Opened |
| Actuate Valve (43) | Closed |
| Fill Return Valve (44) | Closed |
| Actuate Return Valve (45) | Opened |
| Make-Up Valve (46) (optional) | Closed |
| Pay-Out Valve (47) | Opened |
| Lube Valve (48) | Opened |

After the high pressure hydraulic fluid B' is locked in place by the closing of the storage valve 41 based on the storage valve signal 21 from the control unit 60 as described above, and while maintaining the high pressure hydraulic fluid B' locked in place within the energy storage device 50 by the closing of the storage valve 41 based on the storage valve signal 21 from the control unit 60, selected portions of the remainder of the hydraulic cylinder system 80 are staged or otherwise moved into place so that the pressure of the highly pressurized fluid B' may be moved, ported, commutated, or the like back through the hydraulic cylinder system 80 so that it may in turn be delivered to the associated fluid consumer 2 via the output port 14.

With the storage valve 41 closed based on the storage valve signal 21 from the energy storage device 50, the backfill valve 42 may be opened and the fill return valve 44 may be closed to cause the associated fluid source 1 to be delivered to the rod side volume 128 of the working cylinder 121. This causes the working piston 125 to be urged downwardly as viewed in the Figure and to move towards the working pressure end 122 of the working cylinder 121. As is shown, the plunger member 130 is carried on the working piston 125 and is also moved towards the working pressure end 122 of the working cylinder 121 and downwardly as viewed in the Figure. Since the pressure within the blind side volume 108 of the boost cylinder 101 is less than the pressure within the rod side volume 128 of the working cylinder 120 prior to full extraction of the plunger member 130 from the blind side volume 108 of the boost cylinder 101, a fluid check valve 115 is provided. In this regard and in order to overcome the effects of possible suction preventing the withdrawal of the plunger member 130 from boost cylinder 101, a fluid relief is provided. In particular, a fluid check valve 115 is carried by the plunger member 130. In this regard, the plunger member 130 defines a passageway 112 open on a first end 113 to the compression side 107 of the plunger member 130 facing the blind side volume 108 of the boost cylinder 101, and open on a second end 114 on a side 133 of the plunger member 130. Further in this regard, the fluid check valve 115 is operable to permit a flow of hydraulic fluid though the passageway 112 from the second end 114 of the passageway 112 to the first end 113 of the passageway 112, and to restrict the flow of hydraulic fluid though the passageway 112 from the first end 113 of the passageway 112 to the second end 114 of the passageway 112.

The system backfill operation is complete when the working piston 125 is fully retracted to the position disposed against the working pressure end 122, when the plunger member 130 is fully extracted from the blind side volume 108 of the boost cylinder 101, and when the rod side volume 128 of the working cylinder assembly 120 is fully filled with the source hydraulic fluid A received from the associated fluid source 1 as shown in the Figure.

During system backfill, the fluid pressure in the various volumes of the system may be substantially and advantageously different. By way of example and not for purposes of limiting the embodiments, during system backfill, the pressure in the energy storage device 50 may be about 600 psi, the pressure in the blind side volume 108 of the boost cylinder 101 may be about 70 psi, the pressure in rod side volume 128 of the working cylinder assembly 120 may be about 70 psi, the pressure in working side volume 129 of the working cylinder assembly 120 may be about 0 psi, and the pressure in an auxiliary accumulator device 54 may be about 70 psi.

System Pressure Transfer

Figure 7:
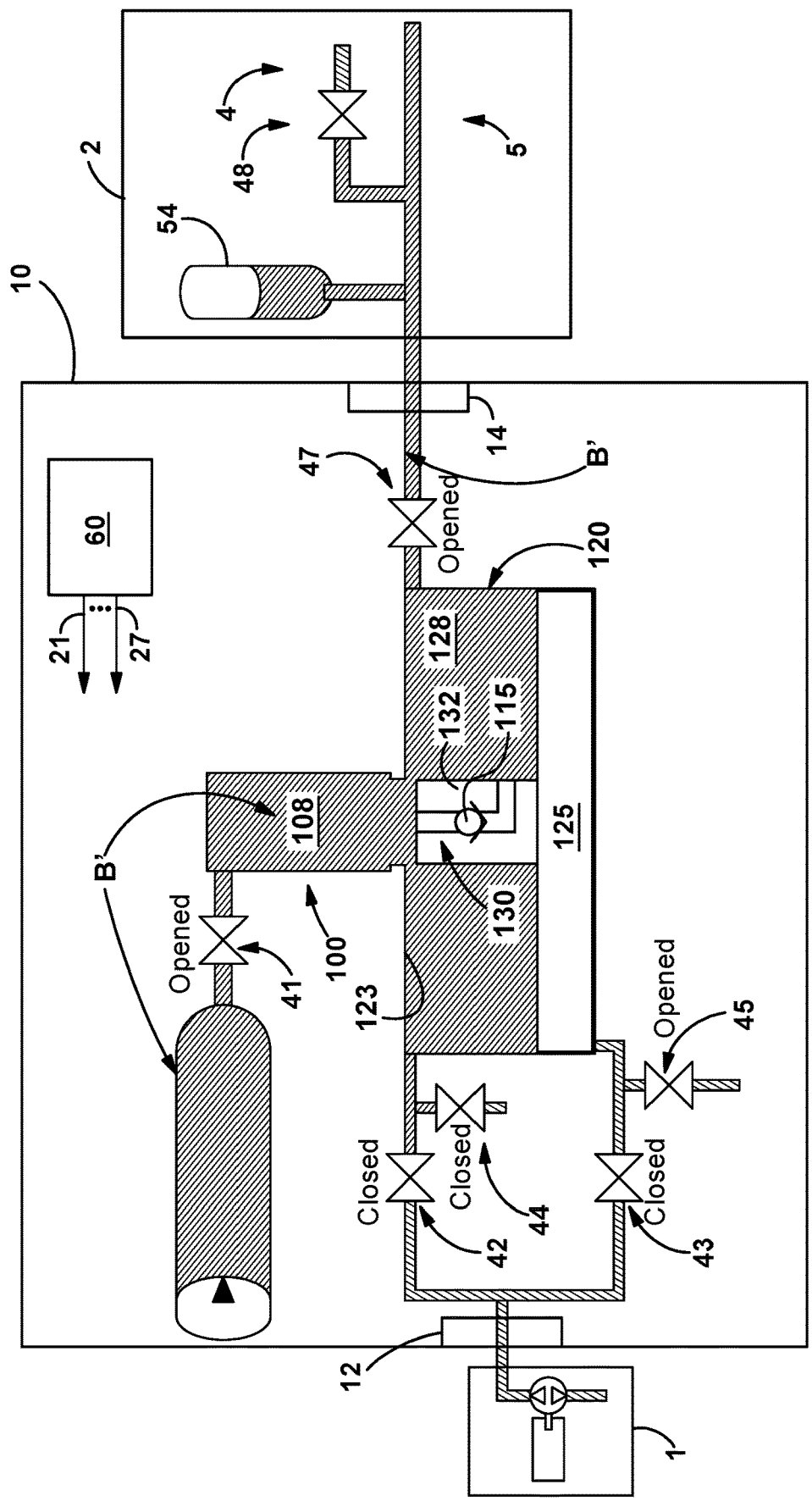
FIG. 7 is a schematic representation of the fluid pressure boost system of FIGS. 1 and 2 showing arrangements and conditions of the components of the system when operated in a system pressure transfer mode of operation in accordance with an example embodiment.

In accordance with the example embodiment and with reference now to FIG. 7, the control unit 60 controls the valve system 40 in a manner that the system 10 may be operated under the control of the control unit 60 to permit the pressure of the highly compressed hydraulic fluid B' stored within the energy storage device 50 to be selectively staged for release to the associated fluid consumer 2 via the output port 14. For this in the example, the valve system 40 is operated by the plurality of valve control signal lines 20 generated by the processor device 62 of the control unit 60 executing the control logic 65 to assume the conditions set out in Table V below.

TABLE V

System Pressure Transfer

| Storage Valve (41) | Opened |
|---|---|
| Fill Valve (42) | Closed |
| Actuate Valve (43) | Closed |
| Fill Return Valve (44) | Closed |
| Actuate Return Valve (45) | Closed |
| Make-Up Valve (46) (optional) | Closed |
| Pay-Out Valve (47) | Opened |
| Lube Valve (48) | Closed |

In the system pressure transfer modality of operation of the hydraulic fluid pressure amplifier system 10 under the control of the control unit 60, the only valve of the valve system 40 that is opened is the storage valve 41 based on the storage valve signal 21 from the control unit 60. That is, the backfill valve 42 and the fill return valve 44 are both in their respective closed conditions, as are the actuate valve 43 and the actuate return valve 45 in their respective closed positions.

In accordance with the example embodiment, opening the storage valve 41 with the remainder of the valves of the valve system 40 in their closed positions allows for the pressure of the high pressure hydraulic fluid B' stored in the energy storage device 50 to be released into the blind side volume 108 of the boost cylinder 101. As noted above, with the plunger member 130 being fully extracted from the blind side volume 108 of the boost cylinder 101, the blind side volume 108 of the boost cylinder 101 is in fluid communication with the rod side volume 128 of the working cylinder 121 via the fluid communication between the boost cylinder aperture 104 and the working rod aperture 124. In that way, the high pressure of the fluid stored within the energy storage device 50 is effectively ported to the rod side volume 128 without any actual transfer or movement of physical fluid between the energy storage device 50, the blind side volume 108, or the rod side volume 128. Only the pressure is communicated without actual transfer of physical material.

During system pressure transfer, the fluid pressure in the various volumes of the system may be substantially and advantageously different. By way of example and not for purposes of limiting the embodiments, during system pressure transfer, the pressure in the energy storage device 50 may be about 600 psi, the pressure in the blind side volume 108 of the boost cylinder 101 may be about 600 psi, the pressure in rod side volume 128 of the working cylinder assembly 120 may be about 600 psi, the pressure in working side volume 129 of the working cylinder assembly 120 may be about 0 psi, and the pressure in an auxiliary accumulator device 54 may be about 600 psi.

System High Pressure Rendering

Figure 8:
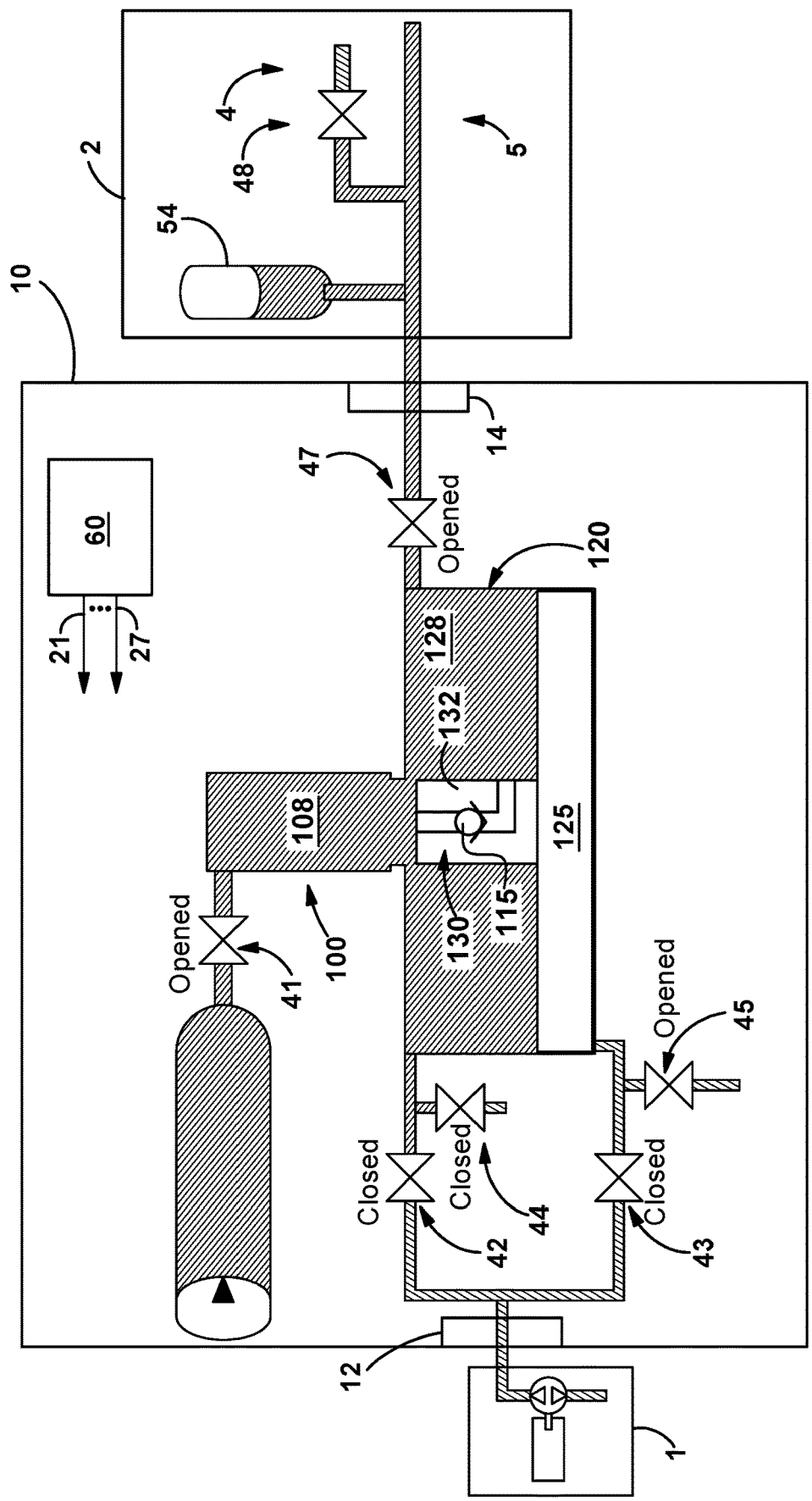
FIG. 8 is a schematic representation of the fluid pressure boost system of FIGS. 1 and 2 showing arrangements and conditions of the components of the system when operated in a system high pressure rendering mode of operation in accordance with an example embodiment.

In accordance with the example embodiment and with reference now to FIG. 8, the control unit 60 controls the valve system 40 in a manner that the system 10 may be operated to permit the pressure of the highly compressed hydraulic fluid B' stored within the energy storage device 50 to be selectively released to the associated fluid consumer 2 via the output port 14. For this in the example, the valve system 40 is operated by the plurality of valve control signal lines 20 generated by the processor device 62 of the control unit 60 executing the control logic 65 to assume the conditions set out in Table VI below.

TABLE VI

| System High Pressure Rendering | |
|---|---|
| Storage Valve (41) | Opened |
| Fill Valve (42) | Closed |
| Actuate Valve (43) | Closed |
| Fill Return Valve (44) | Closed |
| Actuate Return Valve (45) | Closed |
| Make-Up Valve (46) (optional) | Closed |
| Pay-Out Valve (47) | Opened |
| Lube Valve (48) | Closed |

Since the associated fluid consumer 2 consumes the compressed hydraulic fluid from the rod side volume 128 of the working cylinder 121, and since the valves 42-45 remain in their closed operating condition during the system high pressure rendering modality of operation, pressure from the energy storage device 50 may effectively be used without the need to replace or make up any fluid within the system. The internal bladder within the energy storage device 50 is motivated to move internally within the energy storage device 50 as the fluid is consumed from the rod side volume 128 and in turn from the blind side volume 108, to be replaced from the fluid from the energy storage device 50 as the internal bladder within the energy storage device 50 relaxes or otherwise gives up the stored fluid pressure and volume stored within the energy storage device 50. FIG. 8 shows representative pressures within the various components and volumes.

During system pressure rendering, the fluid pressure in the various volumes of the system may be substantially and advantageously change during use such as for example during each shift effected by the associated hydraulic consuming device. By way of example and not for purposes of limiting the embodiments, following a first transmission shift, the pressure in the energy storage device 50 may be about 450 psi, the pressure in the blind side volume 108 of the boost cylinder 101 may be about 450 psi, the pressure in rod side volume 128 of the working cylinder assembly 120 may be about 450 psi, the pressure in working side volume 129 of the working cylinder assembly 120 may be about 0 psi, and the pressure in an auxiliary accumulator device 54 may be about 450 psi.

By way of further example and not for purposes of limiting the embodiments, following a second transmission shift, the pressure in the energy storage device 50 may be about 350 psi, the pressure in the blind side volume 108 of the boost cylinder 101 may be about 350 psi, the pressure in rod side volume 128 of the working cylinder assembly 120 may be about 350 psi, the pressure in working side volume 129 of the working cylinder assembly 120 may be about 0 psi, and the pressure in an auxiliary accumulator device 54 may be about 350 psi.

By way of still further example and not for purposes of limiting the embodiments, following a third transmission shift, the pressure in the energy storage device 50 may be about 250 psi, the pressure in the blind side volume 108 of the boost cylinder 101 may be about 250 psi, the pressure in rod side volume 128 of the working cylinder assembly 120 may be about 250 psi, the pressure in working side volume 129 of the working cylinder assembly 120 may be about 0 psi, and the pressure in an auxiliary accumulator device 54 may be about 250 psi.

Figure 9:
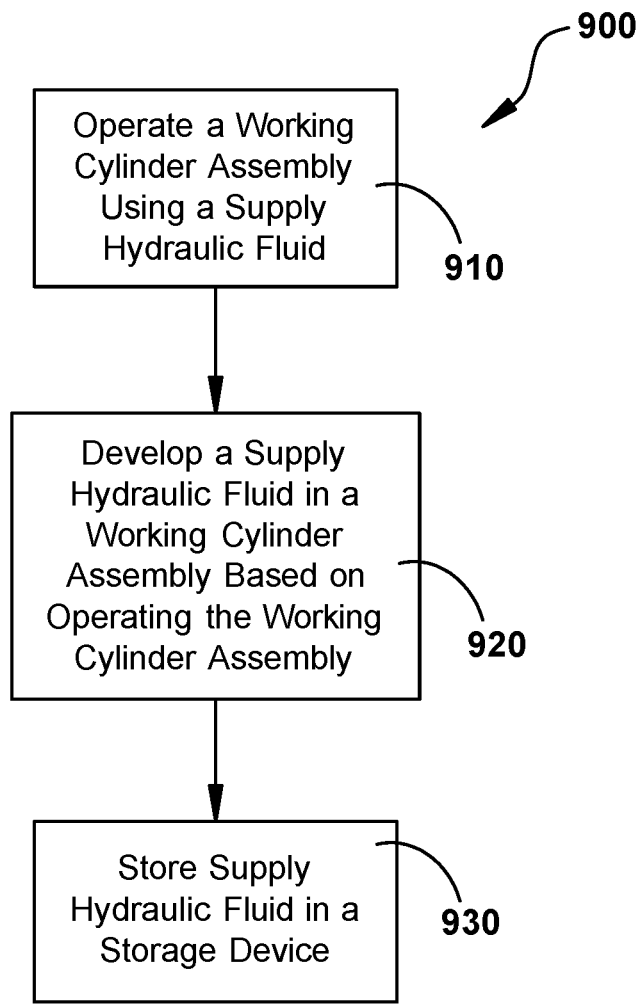
FIG. 9 is a flow diagram illustrating a method of boosting a pressure of a hydraulic fluid from a nominal fluid pressure of a source hydraulic fluid to a supply fluid pressure of a supply hydraulic fluid greater than the nominal fluid pressure in accordance with an example embodiment.

FIG. 9 is a flow diagram illustrating a method 900 of boosting a pressure of a hydraulic fluid from a nominal fluid pressure of a source hydraulic fluid to a supply fluid pressure of a supply hydraulic fluid greater than the nominal fluid pressure in accordance with an example embodiment. With reference now to that Figure, the method 900 includes a step of operating 910 a working hydraulic cylinder assembly 120 using a source hydraulic fluid A having a nominal fluid pressure.

A pressurized supply hydraulic fluid B' is developed in step 920 in a boost cylinder assembly 100 operatively coupled with the working hydraulic cylinder assembly 120. In accordance with the example embodiment, the pressurized supply hydraulic fluid B' is developed based on the operating the working hydraulic cylinder assembly 120. That is, the operating the working hydraulic cylinder assembly 120 causes the development of the pressurized supply hydraulic fluid B'. In accordance with the example embodiment, the pressurized supply hydraulic fluid B' developed in the working hydraulic cylinder assembly 120 has a supply fluid pressure greater than the nominal fluid pressure of the source hydraulic fluid A used to operate the working hydraulic cylinder assembly 120. In addition and as described above, the boost cylinder assembly 100 is operatively coupled with the working hydraulic cylinder assembly 120. In that way and in accordance with the example embodiment, the operation of the working hydraulic cylinder assembly 120 causes or induces the operation of the boost cylinder assembly 101 to generate the supply hydraulic fluid B in the boost cylinder assembly 101 by using the source hydraulic fluid A essentially as a source of power overall, wherein the pressurized supply hydraulic fluid B' developed in the working hydraulic cylinder assembly 120 has a supply fluid pressure greater than the nominal fluid pressure of the source hydraulic fluid A used to operate the working hydraulic cylinder assembly 120.

The pressurized supply hydraulic fluid B' is stored in step 930 of the method 900 in an energy storage device 50 operatively coupled with the boost cylinder assembly 100.

In accordance with an example embodiment, the operating the working hydraulic cylinder assembly 120 comprises effecting movement of a working cylinder piston 125 of the working hydraulic cylinder assembly using the source hydraulic fluid A having the nominal fluid pressure. In addition, the developing the pressurized supply hydraulic fluid B' comprises effecting, by the movement of the working cylinder piston 125, movement of a plunger member 130 carried on the working cylinder piston 125 to compress hydraulic fluid in a blind side volume 108 of a boost cylinder 101 of the boost cylinder assembly 100 to generate the pressurized supply hydraulic fluid B' having the amplified fluid pressure greater than the nominal fluid pressure within the boost cylinder assembly 100.

In accordance with a further example embodiment, the operating the working hydraulic cylinder assembly 120 comprises effecting movement of a working cylinder piston 125 of the working hydraulic cylinder assembly 120 using the source hydraulic fluid A having the nominal fluid pressure to cause a member 130 operatively coupled with the working cylinder piston 125 of the working hydraulic cylinder assembly 120 to extend into the boost cylinder assembly 100. In addition, the developing the pressurized supply hydraulic fluid B' comprises compressing, by the member 130 of the working hydraulic cylinder assembly 120 caused to extend into the boost cylinder assembly 100, a portion of the source hydraulic fluid A in the boost cylinder assembly 100 to generate the pressurized supply hydraulic fluid B' having the supply fluid pressure greater than the nominal fluid pressure within the boost cylinder assembly 100.

In addition, the method 900 may further comprise communicating the amplified fluid pressure of the pressurized supply hydraulic fluid B' stored within the energy storage device 50 to the working hydraulic cylinder assembly 120 to boost the nominal fluid pressure of the source hydraulic fluid A within the working hydraulic cylinder assembly 120 to the amplified fluid pressure greater than the nominal fluid pressure.

It is to be appreciated that the communicating the amplified fluid pressure of the pressurized supply hydraulic fluid B' stored within the energy storage device 50 to the working hydraulic cylinder assembly 120 may comprise applying the pressurized supply hydraulic fluid B' stored within the energy storage device 50 to the hydraulic fluid in the blind side volume 108 of the boost cylinder 101 of the boost cylinder assembly 100, and acting upon backfill hydraulic fluid within the working hydraulic cylinder assembly 120 by the hydraulic fluid in the blind side volume 108 of the boost cylinder 101 via an aperture 104 defined between the boost and working hydraulic cylinders 100, 120 to boost the nominal fluid pressure of the backfill hydraulic fluid within the working hydraulic cylinder assembly 120 to the amplified fluid pressure greater than the nominal fluid pressure.

In accordance with a further example embodiment, the operating the working hydraulic cylinder assembly 120 comprises effecting movement of a working cylinder piston 125 of the working hydraulic cylinder assembly 120 using the source hydraulic fluid A having the nominal fluid pressure to cause a plunger member 130 operatively coupled with the working cylinder piston 125 of the working hydraulic cylinder assembly 120 to extend into the boost cylinder assembly 100. In addition, the developing the pressurized supply hydraulic fluid B' comprises compressing, by the plunger member 130 extending via a passageway 104, 124 into the boost cylinder assembly 100, hydraulic fluid in the boost cylinder assembly 100 to generate the pressurized supply hydraulic fluid B' having the amplified fluid pressure greater than the nominal fluid pressure within the boost cylinder assembly 100.

In accordance with a further example embodiment, the method 900 may further include communicating the amplified fluid pressure of the pressurized supply hydraulic fluid B' stored within the energy storage device 50 to the working hydraulic cylinder assembly 120 to boost the nominal fluid pressure of the source hydraulic fluid A within the working hydraulic cylinder assembly 120 to the amplified fluid pressure greater than the nominal fluid pressure.

In accordance with a further example embodiment, the communicating the amplified fluid pressure of the pressurized supply hydraulic fluid B' stored within the energy storage device 50 to the working hydraulic cylinder assembly 120 may comprise operating the working hydraulic cylinder assembly 120 to effect movement of the working cylinder piston 125 of the working hydraulic cylinder assembly 120 using the source hydraulic fluid A having the nominal fluid pressure to cause the plunger member 130 operatively coupled with the working cylinder piston 125 of the working hydraulic cylinder assembly 120 to withdraw via the passageway 104, 124 from the boost cylinder assembly 100, applying the pressurized supply hydraulic fluid B' stored within the energy storage device 50 to the boost cylinder assembly 100, and communicating the pressurized supply hydraulic fluid B' from the boost cylinder assembly 100 to the working hydraulic cylinder assembly 120 via the passageway 104, 124.

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

The invention claimed is:

1. A hydraulic fluid pressure amplifier system comprising:
 a boost cylinder assembly comprising:
  a boost cylinder defining a blind side volume between opposite high pressure and return ends of the boost cylinder,
  wherein the boost cylinder is configured to selectively receive a plunger member into the boost cylinder,
  wherein movement of the plunger member received in the boost cylinder towards the high pressure end of the boost cylinder compresses a charge fluid within the blind side volume of the boost cylinder from a first fluid pressure to an amplified fluid pressure greater than the first fluid pressure;
a working cylinder assembly operatively connected with the boost cylinder assembly and being selectively operable responsive to receiving a source hydraulic fluid having a nominal fluid pressure less than the amplified fluid pressure for effecting the movement of the plunger member towards the high pressure end of the boost cylinder;
an energy storage device in fluid communication with the blind side volume of the boost cylinder, the energy storage device being operable to selectively receive and store a portion of the charge fluid compressed to the amplified fluid pressure; and
a fluid check valve carried by the plunger member,
wherein the plunger member defines a passageway open on a first end to the compression side of the plunger member facing the blind side volume of the boost cylinder, and open on a second end on a side of the plunger member,
wherein the fluid check valve is operable to: i) permit a flow of hydraulic fluid though the passageway from the second end of the passageway to the first end of the passageway; and ii) restrict the flow of hydraulic fluid though the passageway from the first end of the passageway to the second end of the passageway.

2. The hydraulic fluid pressure amplifier system according to claim 1, wherein:
the working cylinder assembly comprises a working cylinder and a working cylinder piston movable within the working cylinder; and
the plunger member and the working cylinder piston are operatively mutually coupled.

3. The hydraulic fluid pressure amplifier system according to claim 2, wherein:
the working cylinder piston divides the working cylinder into volumetric sections comprising a rod side volume and a working side volume; and
the working cylinder piston is operable responsive to the working cylinder assembly receiving the source hydraulic fluid into the working side volume of the working cylinder to move the plunger member into the boost cylinder to compress the charge fluid within the blind side volume of the boost cylinder.

4. The hydraulic fluid pressure amplifier system according to claim 3, further comprising:
a valve system comprising:
a storage valve disposed between the boost cylinder assembly and the energy storage device, the storage valve being responsive to a storage valve signal to open to permit a flow of the charge fluid having the amplified fluid pressure between the blind side volume of the boost cylinder assembly and the energy storage device for the energy storage device to selectively receive and store the portion of the charge fluid compressed to the amplified fluid pressure; and
an actuate valve disposed between the working cylinder assembly and an associated fluid source providing the source hydraulic fluid to the hydraulic fluid pressure amplifier system, the actuate valve being responsive to an actuate valve signal to open to permit a flow of the source hydraulic fluid into the working side volume of the working cylinder assembly from the associated fluid source to operate the working cylinder piston to move the plunger member into the boost cylinder to compress the charge fluid within the blind side volume of the boost cylinder.

5. The hydraulic fluid pressure amplifier system according to claim 4, further comprising:
a control system comprising:
a processor device;
an interface device operatively coupled with the processor device;
a memory device operatively coupled with the processor device; and
logic stored in the memory device, the logic being executable by the processor device to cause the hydraulic fluid pressure amplifier system to:
selectively generate the storage valve signal to operate the storage valve to open to permit the flow of the charge fluid having the amplified fluid pressure between the blind side volume of the boost cylinder assembly and the energy storage device; and
selectively generate the actuate valve signal to operate the actuate valve to open to permit the flow of the source hydraulic fluid into the working side volume of the working cylinder assembly from the associated fluid source.

6. A hydraulic fluid pressure amplifier system comprising:
a boost cylinder assembly comprising:
a boost cylinder defining a blind side volume between opposite high pressure and return ends of the boost cylinder,
wherein the boost cylinder is configured to selectively receive a plunger member into the boost cylinder,
wherein movement of the plunger member received in the boost cylinder towards the high pressure end of the boost cylinder compresses a charge fluid within the blind side volume of the boost cylinder from a first fluid pressure to an amplified fluid pressure greater than the first fluid pressure;
a working cylinder assembly operatively connected with the boost cylinder assembly and being selectively operable responsive to receiving a source hydraulic fluid having a nominal fluid pressure less than the amplified fluid pressure for effecting the movement of the plunger member towards the high pressure end of the boost cylinder; and
an energy storage device in fluid communication with the blind side volume of the boost cylinder, the energy storage device being operable to selectively receive and store a portion of the charge fluid compressed to the amplified fluid pressure,
wherein the working cylinder assembly comprises a working cylinder and a working cylinder piston disposed in the working cylinder, wherein the working cylinder piston divides the working cylinder into working cylinder volumetric sections comprising a working side volume configured to receive the source hydraulic fluid, and a rod side volume in fluid communication with the blind side volume of the boost cylinder,
wherein a pressurized hydraulic fluid having the amplified fluid pressure is selectively delivered to an output port operatively coupled with the rod side volume of the working cylinder assembly by:
the amplified fluid pressure of the portion of the charge fluid stored in the energy storage device being selectively communicated to backfill hydraulic fluid in the rod side volume of the working cylinder assembly via:

the charge fluid in the blind side volume of the boost cylinder acting on the backfill hydraulic fluid in the rod side volume of the working cylinder assembly.

7. A hydraulic fluid pressure amplifier system comprising:
a boost cylinder assembly comprising:
a boost cylinder defining a blind side volume between opposite high pressure and return ends of the boost cylinder,
wherein the boost cylinder is configured to selectively receive a plunger member into the boost cylinder,
wherein movement of the plunger member received in the boost cylinder towards the high pressure end of the boost cylinder compresses a charge fluid within the blind side volume of the boost cylinder from a first fluid pressure to an amplified fluid pressure greater than the first fluid pressure; and
a working cylinder assembly operatively connected with the boost cylinder assembly and being selectively operable responsive to receiving a source hydraulic fluid having a nominal fluid pressure less than the amplified fluid pressure for effecting the movement of the plunger member towards the high pressure end of the boost cylinder;
wherein the working cylinder assembly comprises a working cylinder and a working cylinder piston disposed in the working cylinder, wherein the working cylinder piston divides the working cylinder into working cylinder volumetric sections comprising a working side volume configured to receive the source hydraulic fluid, and a rod side volume in fluid communication with the blind side volume of the boost cylinder,
wherein the plunger member is carried on the working cylinder piston,
wherein the return end of the boost cylinder defines a boost cylinder aperture configured to selectively receive the plunger member into the blind side volume of the boost cylinder to compress the charge fluid within the blind side volume of the boost cylinder from the first fluid pressure to the amplified fluid pressure greater than the first fluid pressure.

8. The hydraulic fluid pressure amplifier system according to claim 7, further comprising:
a seal member disposed on the return end of the boost cylinder, the seal member effecting a fluid seal between the boost cylinder aperture and the plunger member received into the blind side volume of the boost cylinder.

9. The hydraulic fluid pressure amplifier system according to claim 8, wherein:
the plunger member defines a compression side facing the blind side volume of the boost cylinder, wherein the compression side has a first surface area;
the working cylinder piston defines a low pressure side open to the working side volume of the working cylinder and having a second surface area greater than the first surface area of the compression side of the plunger member; and
the working cylinder piston is selectively movable relative to the working cylinder for effecting the movement of the plunger member towards the high pressure end of the boost cylinder responsive to the working cylinder assembly receiving the source hydraulic fluid into the working side volume of the working cylinder.

10. The hydraulic fluid pressure amplifier system according to claim 9, wherein:
the working cylinder piston is operable to move between opposite working pressure and high pressure ends of the working cylinder;
the working cylinder assembly is configured to alternately:
receive the source hydraulic fluid having the nominal fluid pressure less than the amplified fluid pressure into the rod side volume of the working cylinder as backfill fluid to operate the working cylinder piston to move towards the working pressure end of the working cylinder; and
receive via the boost cylinder aperture as the compression side of the plunger member withdraws from the boost cylinder aperture the amplified fluid pressure of the charge fluid within the blind side volume of the boost cylinder to pressurize the backfill fluid within the rod side volume of the working cylinder to the amplified fluid pressure to form a pressurized hydraulic fluid for selective delivery to an output port of the hydraulic fluid pressure amplifier system operatively coupled with the working cylinder assembly.

11. A hydraulic fluid pressure amplifier system comprising:
a boost cylinder assembly comprising:
a boost cylinder defining a blind side volume between opposite high pressure and return ends of the boost cylinder,
wherein the boost cylinder is configured to selectively receive a plunger member into the boost cylinder,
wherein movement of the plunger member received in the boost cylinder towards the high pressure end of the boost cylinder compresses a charge fluid within the blind side volume of the boost cylinder from a first fluid pressure to an amplified fluid pressure greater than the first fluid pressure;
a working cylinder assembly operatively connected with the boost cylinder assembly and being selectively operable responsive to receiving a source hydraulic fluid having a nominal fluid pressure less than the amplified fluid pressure for effecting the movement of the plunger member towards the high pressure end of the boost cylinder;
an energy storage device in fluid communication with the blind side volume of the boost cylinder, the energy storage device being operable to selectively receive and store a portion of the charge fluid compressed to the amplified fluid pressure;
a valve system comprising:
a storage valve disposed between the boost cylinder assembly and the energy storage device, the storage valve being responsive to a storage valve signal to open to permit a flow of the charge fluid having the amplified fluid pressure between the blind side volume of the boost cylinder assembly and the energy storage device for the energy storage device to selectively receive and store the portion of the charge fluid compressed to the amplified fluid pressure; and
an actuate valve disposed between the working cylinder assembly and an associated fluid source providing the source hydraulic fluid to the hydraulic fluid pressure amplifier system, the actuate valve being responsive to an actuate valve signal to open to permit a flow of the source hydraulic fluid into the working side volume of the working cylinder assembly from the associated fluid source to operate the working cylinder piston to move the plunger member into the boost cylinder to compress the charge fluid within the blind side volume of the boost cylinder; and a control system comprising:
  a processor device;
  an interface device operatively coupled with the processor device;
  a memory device operatively coupled with the processor device; and
  logic stored in the memory device, the logic being executable by the processor device to cause the hydraulic fluid pressure amplifier system to:
    selectively generate the storage valve signal to operate the storage valve to open to permit the flow of the charge fluid having the amplified fluid pressure between the blind side volume of the boost cylinder assembly and the energy storage device; and
    selectively generate the actuate valve signal to operate the actuate valve to open to permit the flow of the source hydraulic fluid into the working side volume of the working cylinder assembly from the associated fluid source wherein the working cylinder piston divides the working cylinder into volumetric sections comprising a rod side volume and a working side volume,
wherein the valve system comprises a backfill valve disposed between the working cylinder and the associated fluid source, the backfill valve being responsive to a backfill valve signal to open to permit a flow of a backfill hydraulic fluid into the rod side volume of the working cylinder assembly from the associated fluid source,
wherein the logic is executable by the processor device to cause the hydraulic fluid pressure amplifier system to selectively generate the backfill valve signal to operate the backfill valve to open to permit the flow of the backfill hydraulic fluid into the rod side volume of the working cylinder assembly from the associated fluid source.

12. The hydraulic fluid pressure amplifier system according to claim 11, wherein:
the logic is executable by the processor device to sequentially generate the backfill valve signal, the actuate valve signal, and the storage valve signal, to sequentially operate the backfill valve, the actuate valve, and the storage valve to render from the working cylinder assembly, based on the source hydraulic fluid having the nominal fluid pressure, a pressurized hydraulic fluid having the amplified fluid pressure for selective delivered to an output port of the fluid pressure amplifier system operatively coupled with the working cylinder assembly.

13. A method of boosting a pressure of a hydraulic fluid, the method comprising:
operating a working hydraulic cylinder assembly using a source hydraulic fluid having a nominal fluid pressure;
developing, based on the operating the working hydraulic cylinder assembly, a pressurized supply hydraulic fluid in a boost cylinder assembly operatively coupled with the working hydraulic cylinder assembly, wherein the pressurized supply hydraulic fluid B' has an amplified fluid pressure greater than the nominal fluid pressure;
storing the pressurized supply hydraulic fluid having the amplified fluid pressure in an energy storage device operatively coupled with the boost cylinder assembly; and
communicating the amplified fluid pressure of the pressurized supply hydraulic fluid stored within the energy storage device to the working hydraulic cylinder assembly to boost the nominal fluid pressure of the source hydraulic fluid within the working hydraulic cylinder assembly to the amplified fluid pressure greater than the nominal fluid pressure.

14. The method according to claim 13, wherein:
the operating the working hydraulic cylinder assembly comprises effecting movement of a working cylinder piston of the working hydraulic cylinder assembly using the source hydraulic fluid having the nominal fluid pressure; and
the developing the pressurized supply hydraulic fluid in the boost cylinder assembly comprises effecting, by the movement of the working cylinder piston, movement of a plunger member carried on the working cylinder piston to compress hydraulic fluid in a blind side volume of a boost cylinder of the boost cylinder assembly to generate the pressurized supply hydraulic fluid having the amplified fluid pressure greater than the nominal fluid pressure within the boost cylinder assembly.

15. The method according to claim 14, wherein the communicating comprises:
applying the pressurized supply hydraulic fluid stored within the energy storage device to the hydraulic fluid in the blind side volume of the boost cylinder of the boost cylinder assembly; and
acting upon backfill hydraulic fluid within the working hydraulic cylinder assembly by the hydraulic fluid in the blind side volume of the boost cylinder via an aperture defined between the boost and working hydraulic cylinders to boost the nominal fluid pressure of the backfill hydraulic fluid within the working hydraulic cylinder assembly to the amplified fluid pressure greater than the nominal fluid pressure.

16. The method according to claim 13, wherein:
the operating the working hydraulic cylinder assembly comprises effecting movement of a working cylinder piston of the working hydraulic cylinder assembly using the source hydraulic fluid having the nominal fluid pressure to cause a plunger member operatively coupled with the working cylinder piston of the working hydraulic cylinder assembly to extend into the boost cylinder assembly; and
the developing the pressurized supply hydraulic fluid comprises compressing, by the plunger member extending via a passageway into the boost cylinder assembly, hydraulic fluid in the boost cylinder assembly to generate the pressurized supply hydraulic fluid having the amplified fluid pressure greater than the nominal fluid pressure within the boost cylinder assembly.

17. A method of boosting a pressure of a hydraulic fluid, the method comprising:
operating a working hydraulic cylinder assembly using a source hydraulic fluid having a nominal fluid pressure;
developing, based on the operating the working hydraulic cylinder assembly, a pressurized supply hydraulic fluid in a boost cylinder assembly operatively coupled with the working hydraulic cylinder assembly, wherein the pressurized supply hydraulic fluid B' has an amplified fluid pressure greater than the nominal fluid pressure;

storing the pressurized supply hydraulic fluid having the amplified fluid pressure in an energy storage device operatively coupled with the boost cylinder assembly; and communicating the amplified fluid pressure of the pressurized supply hydraulic fluid stored within the energy storage device to the working hydraulic cylinder assembly to boost the nominal fluid pressure of the source hydraulic fluid within the working hydraulic cylinder assembly to the amplified fluid pressure greater than the nominal fluid pressure.

18. The method according to claim 17, wherein the communicating comprises:

operating the working hydraulic cylinder assembly to effect movement of the working cylinder piston of the working hydraulic cylinder assembly using the source hydraulic fluid having the nominal fluid pressure to cause the plunger member operatively coupled with the working cylinder piston of the working hydraulic cylinder assembly to withdraw via the passageway from the boost cylinder assembly;

applying the pressurized supply hydraulic fluid stored within the energy storage device to the boost cylinder assembly; and communicating the pressurized supply hydraulic fluid from the boost cylinder assembly to the working hydraulic cylinder assembly via the passageway.

* * * * *